United States Patent
Liu et al.

(10) Patent No.: US 12,182,141 B2
(45) Date of Patent: Dec. 31, 2024

(54) PAGE-LEVEL RERANKING FOR RECOMMENDATION

(71) Applicant: HUAWEI TECHNOLOGIES CO., LTD., Shenzhen (CN)

(72) Inventors: Weiwen Liu, Shenzhen (CN); Yunjia Xi, Shenzhen (CN); Jianghao Lin, Shanghai (CN); Ruiming Tang, Shenzhen (CN); Weinan Zhang, Shanghai (CN); Yong Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/191,704

(22) Filed: Mar. 28, 2023

(65) Prior Publication Data

US 2024/0330310 A1 Oct. 3, 2024

(51) Int. Cl.
*G06F 16/2457* (2019.01)
*G06F 16/248* (2019.01)
*G06F 40/103* (2020.01)

(52) U.S. Cl.
CPC ...... *G06F 16/24578* (2019.01); *G06F 16/248* (2019.01); *G06F 40/103* (2020.01)

(58) Field of Classification Search
CPC . G06F 16/24578; G06F 16/248; G06F 40/103
(Continued)

(56) References Cited

U.S. PATENT DOCUMENTS 7,243,102 B1 * 7/2007 Naam ................... G06F 16/334
7,831,548 B1 * 11/2010 Round ................ G06F 16/9537
707/723

(Continued)

FOREIGN PATENT DOCUMENTS

CN 103020286 A * 4/2013
CN 104508692 A * 4/2015 ....... G06F 16/24578
(Continued)

OTHER PUBLICATIONS

Ziegler et al., "Improving Recommendation Lists Through Topic Diversification", in Proceedings of the 14th International Conference on World Wide Web, May 2005, pp. 22-32. (Year: 2005).*

(Continued)

*Primary Examiner* — Phuong Thao Cao
(74) *Attorney, Agent, or Firm* — Leydig, Voit & Mayer, Ltd.

(57) ABSTRACT

A system is provided for reranking. The system comprises a user device and one or more servers. The system is configured to receive a plurality of candidate lists, rerank the plurality of candidate lists based on page-level information and a format of a recommendation page, generate recommendation results based on the reranked lists, and send the recommendation results to the user device. Each candidate list comprises a plurality of candidate items. The page-level information comprises interactions between the candidate items in each candidate list and between different candidate lists among the plurality of candidate lists. The reranking comprises using the format of the recommendation page to determine pairwise item influences between candidate item pairs among the candidate items in the candidate lists. The user device is configured to display the recommendation page with the recommendation results from the one or more servers.

20 Claims, 11 Drawing Sheets

(58) Field of Classification Search
USPC .......................................................... 707/732
See application file for complete search history.

(56) References Cited

U.S. PATENT DOCUMENTS

| | | | | |
|---|---|---|---|---|
| 7,966,334 | B1* | 6/2011 | Bezos ..................... | G06Q 30/06 |
| | | | | 707/748 |
| 8,250,066 | B2* | 8/2012 | Miedema ............ | G06F 16/9535 |
| | | | | 707/723 |
| 9,398,071 | B1* | 7/2016 | Burciu .................... | H04L 43/00 |
| 10,448,120 | B1* | 10/2019 | Bursztyn ............. | H04N 21/4532 |
| 2006/0136377 | A1* | 6/2006 | Patt-Shamir ......... | G06F 16/3346 |
| | | | | 707/E17.115 |
| 2008/0077386 | A1* | 3/2008 | Gao ........................ | G06F 40/40 |
| | | | | 704/E15.04 |
| 2008/0250312 | A1* | 10/2008 | Curtis .................... | G06Q 10/00 |
| | | | | 715/700 |
| 2010/0082434 | A1* | 4/2010 | Chen ................... | G06F 16/9535 |
| | | | | 705/14.55 |
| 2011/0196859 | A1* | 8/2011 | Mei ....................... | G06F 16/248 |
| | | | | 707/723 |
| 2013/0151370 | A1* | 6/2013 | Round .................. | G06F 16/951 |
| | | | | 705/26.7 |
| 2016/0217201 | A1* | 7/2016 | Hummel ................ | G06F 16/35 |
| 2017/0132219 | A1* | 5/2017 | Deng .................. | G06F 16/9024 |
| 2019/0303995 | A1* | 10/2019 | Li ....................... | G06Q 30/0633 |
| 2021/0133199 | A1* | 5/2021 | Erera ................ | G06F 16/24578 |
| 2023/0185815 | A1* | 6/2023 | Kletti ................ | G06F 16/24578 |
| | | | | 707/729 |

FOREIGN PATENT DOCUMENTS

| | | | | |
|---|---|---|---|---|
| CN | 112990987 | A | * 6/2021 | ......... G06F 16/9535 |
| CN | 113641930 | A | * 11/2021 | |
| CN | 114461935 | A | * 5/2022 | |
| KR | 20090048251 | A | * 5/2009 | |
| WO | WO-2015118387 | A1 | * 8/2015 | ............. G06F 16/00 |

OTHER PUBLICATIONS

Lo et al., "Page-level Optimization of e-Commerce Item Recommendations", in Proceedings of the 15th ACM Conference on Recommender Systems (RecSys' 21), Sep. 2021, pp. 495-504. (Year: 2021).*

Xi et al., "A Bird's-eye View of Reranking: from List Level to Page Level", arXiv:2211.09303v1 [cs.IR], Nov. 17, 2022, 10 pages. (Year: 2022).*

Xi et al., "Multi-Level Interaction Reranking with User Behavior History", arXiv:2204.09370v1 [cs.IR], Apr. 20, 2022, 11 pages. (Year: 2022).*

Xi et al., "A Bird's-eye View of Reranking: from List Level to Page Level," arXiv:2211.09303v1 [cs.IR], Total 10 pages (Nov. 17, 2022).

\* cited by examiner

PAGE-LEVEL RERANKING FOR RECOMMENDATION

TECHNICAL FIELD

This disclosure relates generally to recommender systems and, more specifically, to reranking algorithms.

BACKGROUND

A recommender system generally refers to a machine learning-based platform or engine that provides recommendations for items most relevant to a particular user. Especially, when a service offers a large number of items for users to choose from, recommender systems are very useful for filtering items based on user needs. Depending on the usage scenario, suggested items can be of various types, such as products to buy, videos to watch, social media posts to read.

A multi-stage recommender system (MRS) is a recommender system that includes multiple sequential stages, such as pre-ranking (or raw ranking), ranking, and reranking stages. An MRS optimizes the recommendation results step by step through multiple stages to make the final recommendation results more accurate.

Reranking is typically the final stage of an MRS, which re-orders the input ranking lists from the previous ranking stage by modeling cross-item influence. The goal of reranking is to maximize the total utility of the reranked lists, such as overall revenue or number of clicks. Reranking is crucial in an MRS as it directly affects user experience and satisfaction.

Various reranking models have been developed in recent years, such as Personalized Reranking Model (PRM) and SetRank (i.e., directly learns a permutation-invariant ranking model defined on document sets of any size). These reranking models improve the accuracy of recommendation results and therefore are widely used in industrial recommender systems. However, existing reranking models are mainly list-level reranking models. List-level models rerank singe lists at a time and only account for cross-item influence within a single list. This reranking strategy, while found useful in many industrial applications, may still be suboptimal, especially when the recommendation page finally presented to a user is in a multi-list style.

Deep and hierarchical attention network reranking (DHANR) model incorporates page-level information by transforming items on the page to a static page representation by a hierarchical attention network. Particularly, DHANR first adopts an identical attention mechanism to items within each list to obtain a representation vector for the particular list. Then, the attention mechanism is applied to representation vectors of multiple lists within a page to obtain a representation vector of the page. Finally, the representation vector of the page is fed as shared side information into a fully connected network layer to obtain a reranking score for each item in the multiple lists.

However, DHANR has the following limitations. Since DHANR simply feeds the obtained page representation into the list-level reranking model as static side information for each individual list, DHANR is unaware of the dynamic inter-list interactions between items or the page format of the entire page. Furthermore, DHANR fails to capture both commonalities and differences in user behavior across lists.

SUMMARY

In an exemplary embodiment, the present disclosure provides a system for reranking. The system comprises a user device and one or more servers. The user device comprises a display and a communications interface. The system is configured to receive a plurality of candidate lists, rerank the plurality of candidate lists based on page-level information and a format of a recommendation page, generate recommendation results based on the reranked lists, and send the recommendation results to the user device. Each candidate list comprises a plurality of candidate items. The page-level information comprises interactions between the candidate items in each candidate list and between different candidate lists among the plurality of candidate lists. The reranking comprises using the format of the recommendation page to determine pairwise item influences between candidate item pairs among the candidate items in the candidate lists. The user device is configured to display the recommendation page with the recommendation results from the one or more servers.

In a further exemplary embodiment, the one or more servers are further configured to obtain item-level interactions for each candidate list among the plurality of candidate lists, obtain list-level interactions for the recommendation page based on the item-level interactions for the candidate lists, and generate a shared page representation for the recommendation page as the page-level information based on the list-level interactions. The item-level interactions comprise interactions between each pair of candidate items in the particular candidate list among the plurality of candidate lists. The item-level interactions comprises interactions between the candidate items in the particular candidate lists and user history data. The list-level interactions comprises interactions between each pair of candidate lists among the plurality of candidate lists.

In a further exemplary embodiment, the user history data comprises user clicking, subscribing, downloading, and any combination thereof in a past period of time.

In a further exemplary embodiment, the one or more servers are further configured to generate a distance matrix based on the format of the recommendation page, and determine the pairwise item influences between the corresponding candidate item pairs among the candidate items in the candidate lists based on the distance matrix. Each element in the distance matrix indicates a distance between a corresponding pair of candidate items from the plurality of candidate lists.

In a further exemplary embodiment, the distance between the corresponding pair of candidate items from the plurality of candidate lists is determined based on Euclidean distance, slot counting, or Manhattan distance.

In a further exemplary embodiment, the distance between the corresponding pair of candidate items from the plurality of candidate lists is categorized into one of five positional relationships according to positions of the particular pair of candidate items to be displayed on the recommendation page. The five positional relationships comprises (a) a pair of adjacent items in a same list, (b) a pair of distant items in a same list, (c) a pair of adjacent items in neighboring lists, (d) a pair of distant items in neighboring lists, and (e) a pair of distant items in different lists, wherein the different lists are not neighboring lists.

In a further exemplary embodiment, the one or more servers are further configured to determine a pairwise item influence vector for each candidate item in the candidate lists. The reranking of the plurality of candidate lists based on the page-level information and the format of the recommendation page further comprises determining reranking scores for each candidate item in the candidate lists based on the page-level information and the pairwise item influence vector for the particular item in a particular candidate list among the plurality of candidate lists.

In a further exemplary embodiment, the reranking of the plurality of candidate lists based on the page-level information and the format of the recommendation page further comprises generating a combined feature vector for each candidate item in the candidate lists based on the page-level information, the pairwise item influences associated with the particular candidate item, and a dense feature for the particular candidate item, determining a set of parameters to select a subset of trained networks among a plurality of trained networks to process the particular combined feature vector for the particular candidate item for the particular candidate list comprising the particular candidate item, and determining a reranking score for the particular candidate item, based on outputs from the particular subset of trained networks.

In a further exemplary embodiment, the generation of the recommendation results based on the reranked lists for display on the recommendation page further comprises sorting items in the reranked lists, according to the reranking scores for the corresponding candidate items. The user device is further configured to display the sorted items in the reranked lists into corresponding positions according to the format of the recommendation page.

In a further exemplary embodiment, each candidate list among the plurality of candidate lists is associated with a particular set of parameters to select a particular subset of trained networks among the plurality of trained networks.

In a further exemplary embodiment, each trained network among the plurality of trained networks is trained to capture one aspect of behavior patterns.

In a further exemplary embodiment, the reranking of the plurality of candidate lists based on the page-level information and the format of the recommendation page is performed using a single model, and wherein the single model is trained and updated periodically through offline training.

In a further exemplary embodiment, the recommendation page is in a multi-list style.

In a further exemplary embodiment, the recommendation results comprises video, music, news, or e-commence recommendations.

In another exemplary embodiment, the present disclosure provides a computer-implemented method for reranking performed by a processing system. The method comprises receiving a plurality of candidate lists, reranking the plurality of candidate lists based on page-level information and a format of a recommendation page, and generating recommendation results based on the reranked lists for display on the recommendation page. Each candidate list comprises a plurality of candidate items. The page-level information comprises interactions between the candidate items in each candidate list and between different candidate lists among the plurality of candidate lists. The reranking comprises using the format of the recommendation page to determine pairwise item influences between candidate item pairs among the candidate items in the candidate lists.

In a further exemplary embodiment, the method further comprises obtaining item-level interactions for each candidate list among the plurality of candidate lists, obtaining list-level interactions for the recommendation page based on the item-level interactions for the candidate lists, and generating a shared page representation for the recommendation page as the page-level information based on the list-level interactions.

In a further exemplary embodiment, the method further comprises generating a distance matrix based on the format of the recommendation page, and determining the pairwise item influences between the corresponding candidate item pairs among the candidate items in the candidate lists based on the distance matrix. Each element in the distance matrix indicates a distance between a corresponding pair of candidate items from the plurality of candidate lists.

In a further exemplary embodiment, the method further comprises determining a pairwise item influence vector for each candidate item in the candidate lists. Reranking the plurality of candidate lists based on the page-level information and the format of the recommendation page further comprises determining, by the processing system, reranking scores for each candidate item in the candidate lists based on the page-level information and the pairwise item influence vector for the particular item in a particular candidate list among the plurality of candidate lists.

In a further exemplary embodiment, reranking the plurality of candidate lists based on the page-level information and the format of the recommendation page further comprises generating a combined feature vector for each candidate item in the candidate lists based on the page-level information, the pairwise item influences associated with the particular candidate item, and a dense feature for the particular candidate item, determining a set of parameters to select a subset of trained networks among a plurality of trained networks to process the particular combined feature vector for the particular candidate item for the particular candidate list comprising the particular candidate item, and determining a reranking score for the particular candidate item, based on outputs from the particular subset of trained networks.

In yet another exemplary embodiment, the present disclosure provides a non-transitory computer-readable medium for reranking. The non-transitory computer-readable medium has computer-executable instructions stored thereon. When executed by one or more processors, the computer-executable instructions cause the one or more processors to facilitate receiving a plurality of candidate lists, reranking the plurality of candidate lists based on page-level information and a format of a recommendation page, and generating recommendation results based on the reranked lists for display on the recommendation page. Each candidate list comprises a plurality of candidate items. The page-level information comprises interactions between the candidate items in each candidate list and between different candidate lists among the plurality of candidate lists. The reranking comprises using the format of the recommendation page to determine pairwise item influences between candidate item pairs among the candidate items in the candidate lists.

DETAILED DESCRIPTION

Embodiments of the present disclosure provide a reranking model for page-level reranking, which is a unified model for jointly re-ranking multiple lists so as to capture multi-faceted fine-grained mutual influences among lists. The reranking model may include various functional modules for simultaneously obtaining interactions among items in multiple lists, user-specific data, and format information of a recommendation page, thereby reranking items in the multiple lists based on aggregated results.

The reranking model may include a hierarchical dual-side attention module for extracting personalized intra-list and inter-list interactions, and a spatial-scaled attention module devised to integrate spatial relationships into pairwise item influences to model the page format. Furthermore, the reranking model may implement a multi-gated mixture-of-experts module to capture commonalities and differences of user behavior among different lists. Extensive experiments on public and proprietary datasets show that the reranking model significantly outperforms existing baseline models.

It will be appreciated that various techniques to achieve improved reranking discussed herein may be performed alone or in combination with existing techniques for reranking. Additionally, it will be appreciated that exemplary embodiments of the present disclosure are capable of efficiently and effectively analyzing vast amounts of data about user behavior and preferences, allowing for reranking multiple lists simultaneously for millions of users via a computing platform in a manner not achievable by conventional techniques. Further, exemplary embodiments of the present disclosure may take into account the effect of general page format while simultaneously reranking multiple lists while using a single model to jointly re-rank multiple lists and model a page format, allowing items from different lists and themes to be correlated, whereas conventional techniques generally rely on multiple models for separately reranking respective lists (which incurs high maintenance costs). For example, exemplary embodiments of the present disclosure are capable of achieving a processing time of less than 1 millisecond per query, which is far below the general industry guideline of having processing times of less than 100 milliseconds.

Figure 1A:
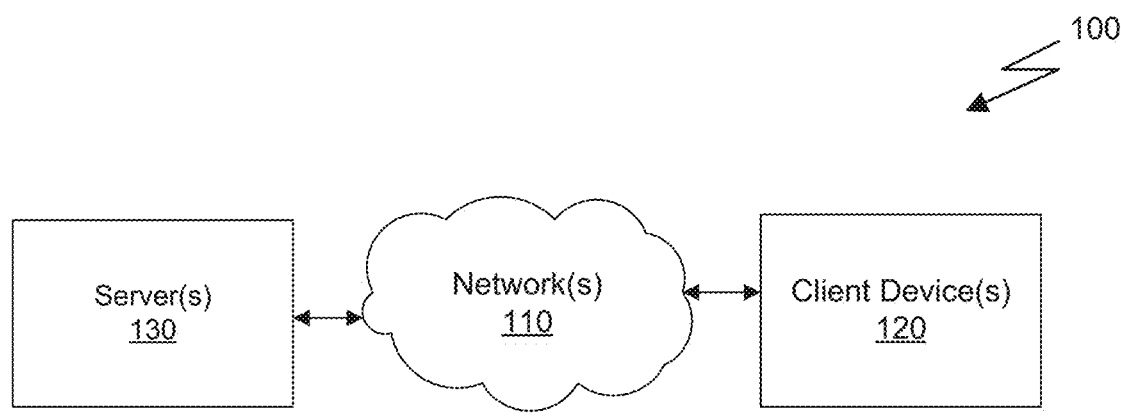
FIG. 1A illustrates an exemplary network environment.

FIG. 1A illustrates an exemplary network environment 100. An MRS implementing a reranking model according to exemplary embodiments of the present disclosure may be implemented using the exemplary network environment 100. It will be recognized by the skilled in the art that the reranking model may be implemented in other suitable machine learning-based platform/engine for any other suitable applications. Network environments suitable for use in implementing embodiments of the disclosure may include one or more client devices 120, servers 130, and/or other device types.

Components of a network environment may communicate with each other via a network(s) 110, which may be wired, wireless, or both. By way of example, network 110 may include one or more Wide Area Networks ("WANs"), one or more Local Area Networks ("LANs"), one or more public networks such as the Internet, and/or one or more private networks. Where the network includes a wireless telecommunications network, components such as a base station, a communications tower, access points, or other components may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces ("APIs")). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

Figure 1B:
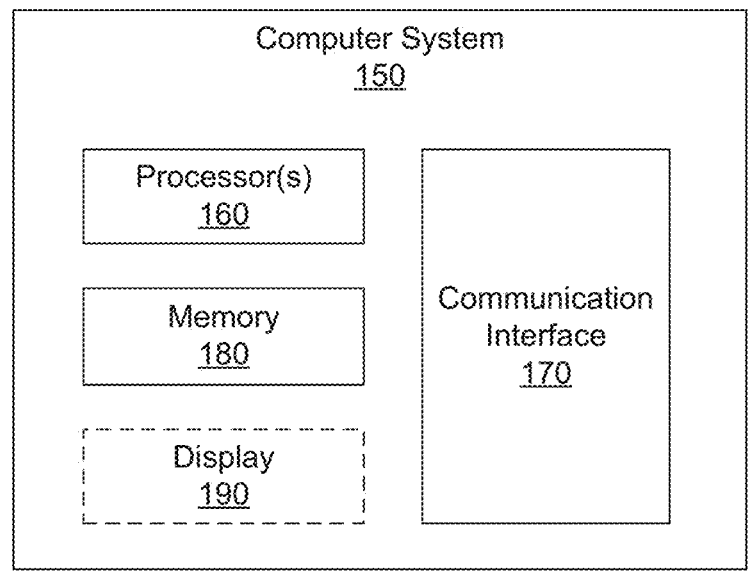
FIG. 1B illustrates an exemplary computer system.

Client device(s) 120 may include at least some of the components, features, and functionality of an example computer system 150 of FIG. 1B. By way of example and not limitation, a client device 120 may be embodied as a Personal Computer ("PC"), a laptop computer, a mobile device, a smartphone, a tablet computer, a virtual reality headset, a video player, a video camera, a vehicle, a virtual machine, a drone, a robot, a handheld communications device, a vehicle computer system, an embedded system controller, a workstation, an edge device, any combination of these delineated devices, or any other suitable device.

FIG. 1B illustrates a block diagram of an exemplary computer system 150 configured to implement various functions. An MRS implementing a reranking model according to exemplary embodiments of the present disclosure may also be implemented using the exemplary computer system 150. In some examples, the computer system 150 may be implemented in a client device 120 or a server 130 in the network environment 100 as shown in FIG. 1A. One or more computing systems 150, one or more client devices 120, one or more servers 130, or the combination thereof may form a processing system (e.g., an MRS) to perform the processes in the present disclosure.

As shown in FIG. 1B, the computer system 150 may include one or more processors 160, a communication interface 170, a memory 180, and a display 190. The processor(s) 160 may be configured to perform the operations in accordance with the instructions stored in the memory 180. The processor(s) 160 may include any appropriate type of general-purpose or special-purpose microprocessor (e.g., a CPU or GPU, respectively), digital signal processor, microcontroller, or the like. The memory 180 may be configured to store computer-readable instructions that, when executed by the processor(s) 160, can cause the processor(s) 160 to perform various operations discussed herein. The memory 180 may be any non-transitory type of mass storage, such as volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM. Various processes/flowcharts described in terms of mathematics in the present disclosure may be realized in instructions stored in the memory 180, when executed by the processor(s) 160.

The communication interface 170 may be configured to communicate information between the computer system 150 and other devices or systems, such as the client device 120 and/or the server 130 as shown in FIG. 1A. In one example, the communication interface 170 may include an integrated services digital network ("ISDN") card, a cable modem, a satellite modem, or a modem to provide a data communication connection. In another example, the communication interface 170 may include a local area network ("LAN") card to provide a data communication connection to a compatible LAN. In a further example, the communication interface 170 may include a high-speed network adapter such as a fiber optic network adaptor, 10G Ethernet adaptor, or the like. Wireless links can also be implemented by the communication interface 170. In such an implementation, the communication interface 170 can send and receive electrical, electromagnetic or optical signals that carry digital data streams representing various types of information via a network. The network can typically include a cellular communication network, a Wireless Local Area Network ("WLAN"), a Wide Area Network ("WAN"), or the like.

The communication interface 170 may also include various I/O devices such as a keyboard, a mouse, a touchpad, a touch screen, a microphone, a camera, a biosensor, etc. A user may input data to the computer system 150 (e.g., a terminal device) through the communication interface 170.

The display 190 may be integrated as part of the computer system 150 or may be provided as a separate device communicatively coupled to the computer system 150. The display 190 may include a display device such as a liquid crystal display ("LCD"), a light emitting diode display ("LED"), a plasma display, or any other type of display, and provide a graphical user interface ("GUI") presented on the display for user input and data depiction. In some embodiments, the display 190 may be integrated as part of the communication interface 170.

A reranking model according to exemplary embodiments of the present disclosure may be extended to any suitable type of deep neural network (DNN) models. A DNN model includes multiple layers of interconnected nodes (e.g., perceptrons, neurons, etc.) that can be trained with enormous amounts of input data to quickly solve complex problems with high accuracy. The first layer in the DNN model, which receives input to the DNN model, is referred to as the input layer. The last layer in the DNN model, which produces outputs of the DNN model, is referred to as the output layer. Any layer between the input layer and the output layer of the DNN model is referred to as the hidden layer. The parameters/weights related to the DNN model may be stored in the memory 180 of a processing system in the form of a data structure.

Figure 2A:
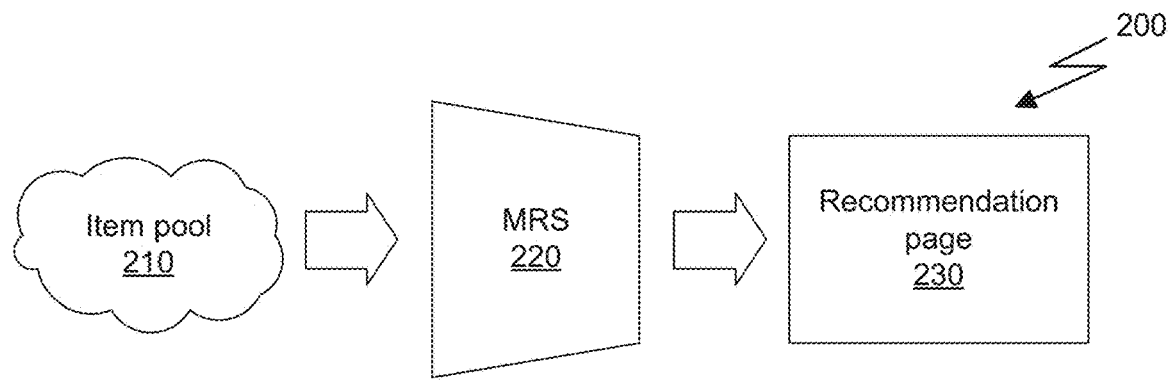
FIG. 2A illustrates an exemplary application of an MRS in accordance with one or more exemplary embodiments of the present disclosure.

FIG. 2A illustrates an exemplary application 200 of an MRS in accordance with one or more exemplary embodiments of the present disclosure. MRS 220 may be implemented in a processing system operating in the network environment 110. The processing system may include one or more computer systems 150 as illustrated in FIG. 1B, which may be embodied as one or more client devices 120, one or more servers 130, or a combination thereof in network environment 100 as depicted in FIG. 1A.

Item pool 210 may include items provided by a particular service. Various services may offer various types of items. For example, e-commerce services may provide merchandise, streaming services may provide content, and social networking services may provide online sharing, etc. In an example, item pool 210 may be stored locally or in the cloud in the form of big data. In another example, each item in item pool 210 and information related to the particular item may be stored in metadata.

MRS 220 may recall a plurality of items from the item pool 210 according to a user request. Then, MRS 220 may process the recalled items through multiple ranking stages to output the items in a number of lists in the desired order. Additionally, MRS 220 may filter some items based on their ranking scores to narrow down the generated list(s) in one or more stages. The final stage of MRS 220 may be a reranking stage that implements the reranking model of the present disclosure. The reranking model may be applied to re-rank the items in the lists output by the previous stage, thereby generating final lists as output of MRS 220.

The output of MRS 220 may be displayed on a recommendation page 230. The recommendation page 230 may be visualized as a graphic user interface (GUI) on a display 190 of a computer system 150. The format (e.g., layout) of the recommendation page 230 may be defined by a service provider for a particular service. The final lists output by MRS 220 may be displayed on the recommendation page 230 according to the format of the recommendation page 230. In an example, MRS 220 may recall the items from the item pool 210 according to the format of the recommendation page 230. For example, MRS 220 may determine the number of lists and/or the number of items in each list to produce according to the format of the recommendation page 230.

Figure 2B:
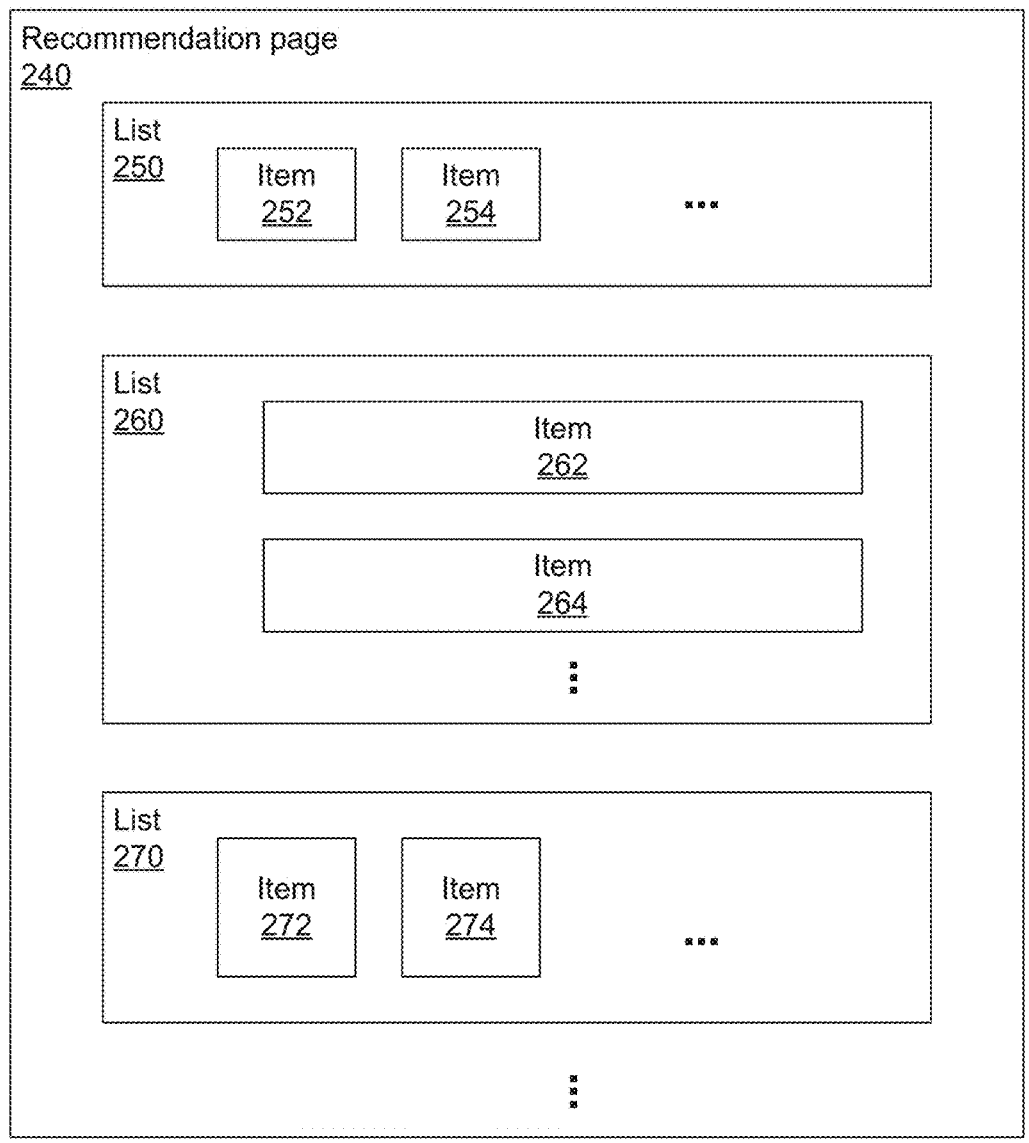
FIG. 2B illustrates an exemplary format of a recommendation page in accordance with one or more exemplary embodiments of the present disclosure.

FIG. 2B illustrates an exemplary format of a recommendation page 240 in accordance with one or more exemplary embodiments of the present disclosure. Those skilled in the art will recognize that the exemplary format as shown in FIG. 2B is for illustration purpose only and is not intended to limit the scope of the present disclosure. Other formats can also be suitable for recommendation pages, such as single vertical list, multiple horizontal/vertical lists, or vertical and horizontal lists interleaved.

As shown in FIG. 2B, the recommendation page 240 may be laid out to present multiple items in multiple lists. For example, list 250 may include items 252 and 254, list 260 may include items 262 and 264, and list 270 may include items 272 and 274. The item lists may be produced by MRS 220 based on items (e.g., candidate items) obtained from the item pool 210.

Each list on a multi-list recommendation page (e.g., the recommendation page 240) may be associated with a particular topic/theme (e.g., "Trending", "Games"). Items from the same list may be related to the same theme. Additionally and/or alternatively, each list may have a tailored layout (e.g., size, location, orientation). The existence of multiple lists may affect each other, thereby changing the user's behavior pattern, resulting in different utility distributions.

Modeling the cross-item influence within the list (i.e., intra-list interaction) and identifying a best permutation of candidate items are objectives of reranking. Inter-list interaction is also utilized for page-level modeling. Particularly, whether a user is interested in an item in a particular list can also be influenced by items shown in other lists. For example, the recommendation page 240 may suggest content to watch of different themes, list 260 may list items with the theme "Recommended For You," and list 250 may list items with the theme "Trending." Assuming a user watched a TV show a few years ago, the utility (e.g., ranking score) of the TV show in the "Recommended For You" list may be very low. However, when the sequel of the TV show appears as item 262 in the "Trending" list, item 262 may prompt the user to watch the TV show again to recall the previous story, resulting in a different utility distribution. The reranking model in exemplary embodiments of the present disclosure considers both intra-list and inter-list interactions to provide a holistic view.

Furthermore, the format of the recommendation page may affect how items interact with each other. For instance, the recommendation page 240 contains an interleaving of vertical and horizontal lists. The horizontal lists 250 and 270 in the recommendation page 240 may be separated by a greater distance from the vertical list 260 than the separation distance between lists on a recommendation page containing only stacked horizontal lists. Therefore, the influence between items from two consecutive horizontal lists may be smaller. If the length and/or size of the vertical list 260 is increased, the influence may become even smaller due to the further expansion of the distance between the horizontal lists 250 and 270. Thus, reranking model of the present disclosure incorporates the page format (e.g., the size and location of the items) for page-level reranking.

The reranking model may also take into account commonalities and distinctions in user behaviors on different lists. On the one hand, user behavior across lists may share basic patterns (e.g., position bias, cascade hypothesis) and underlying personal preferences. Collaboratively putting multiple lists together may benefit the understanding of the underlying common behavior of a particular user. On the other hand, user behavior may also vary from listing to listing due to the subject matter (e.g., theme/topic) and format of a particular list. For example, horizontal lists may have more severe positional bias than vertical lists. In another example, Horizontal lists may be designed as carousel sliders, which may reduce the impression opportunity (e.g., the exposure) for lower-ranked items. Therefore, simply using the same network for all lists may be inferior, since list-specific information is not well captured, especially for low-resource or sparse reranking lists.

Figure 3A:
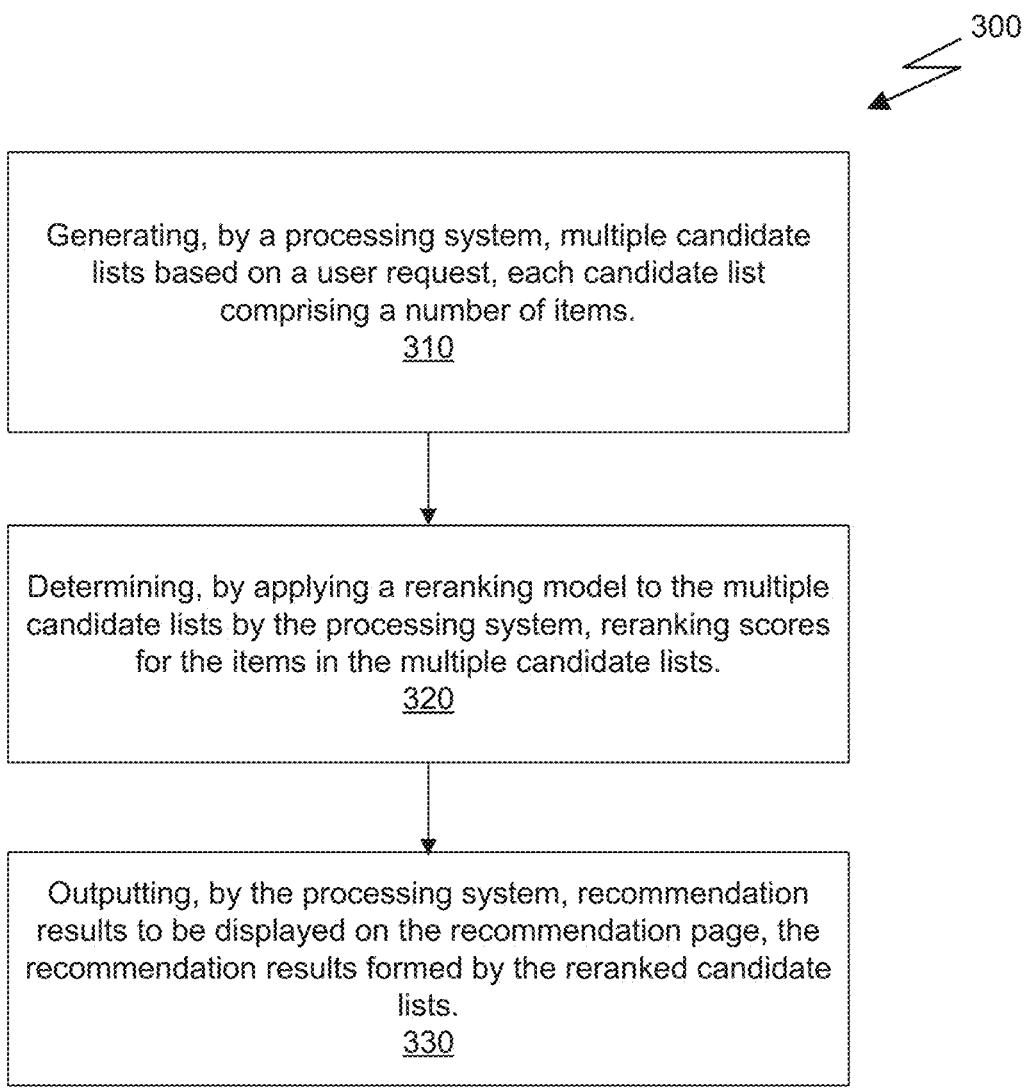
FIG. 3A is an exemplary recommendation process performed by a processing system in accordance with one or more exemplary embodiments of the present disclosure.

FIG. 3A is an exemplary recommendation process 300 performed by a processing system in accordance with one or more exemplary embodiments of the present disclosure. The processing system may include one or more computer systems 150 as illustrated in FIG. 1B, which may be embodied as one or more client devices 120, one or more servers 130, or a combination thereof in network environment 100 as depicted in FIG. 1A. Processer(s) 160 in the processing system may execute instructions stored in memory 180 to perform the recommendation process 300. The recommendation process 300 may be performed alone or in combination with other processes in the present disclosure. It will be appreciated by one skilled in the art that the recommendation process 300 may be performed in any suitable environment and blocks in process 300 may be performed in any suitable order.

At block 310, the processing system generates multiple candidate lists based on a user request. Each candidate list includes a number of items.

The processing system may receive requests from users, which may trigger the generation of multiple lists. The requests may be generated in various suitable usage scenarios, for example, when a user opens a particular application that displays a recommendation page to the user, or when the user requests search results by entering a search term. The requests may be generated based on various forms of input, such as text, sound, graphics, etc. The request may include information related to the recommendation page (e.g., number of items/lists, themes, etc.) and/or information related to the user (e.g., user profile).

After receiving a request, the processing system may recall a plurality of items from an item pool. In an example, each item may include metadata that describes certain attributes (e.g., features) of the particular item. The processing system may recall items based on the attributes of the items upon request. The processing system may generate multiple lists based on the recalled items, and each list may correspond to a list displayed on the recommendation page.

In some instances, the processing system may implement one or more ranking stages to generate multiple candidate lists as input to a reranking stage. The one or more ranking stages may include pre-ranking and/or ranking stages, which may be applied to determine ranking scores for items in each candidate list and optionally filter out less relevant items.

At block 320, the processing system determines reranking scores for items in the candidate lists by applying a reranking model. The processing system may implement the reranking model in the reranking stage to generate final lists for display by re-ordering items in the candidate lists.

The reranking model may be used to learn interactions between items within and across the candidate lists, interactions between items and a particular user's historical data, and interactions between items and the page format. Furthermore, the reranking model may incorporate the commonalities and differences in user behaviors. In this way, the processing system may use the reranking model to determine more accurate reranking scores for items in the candidate lists.

Figure 3B:
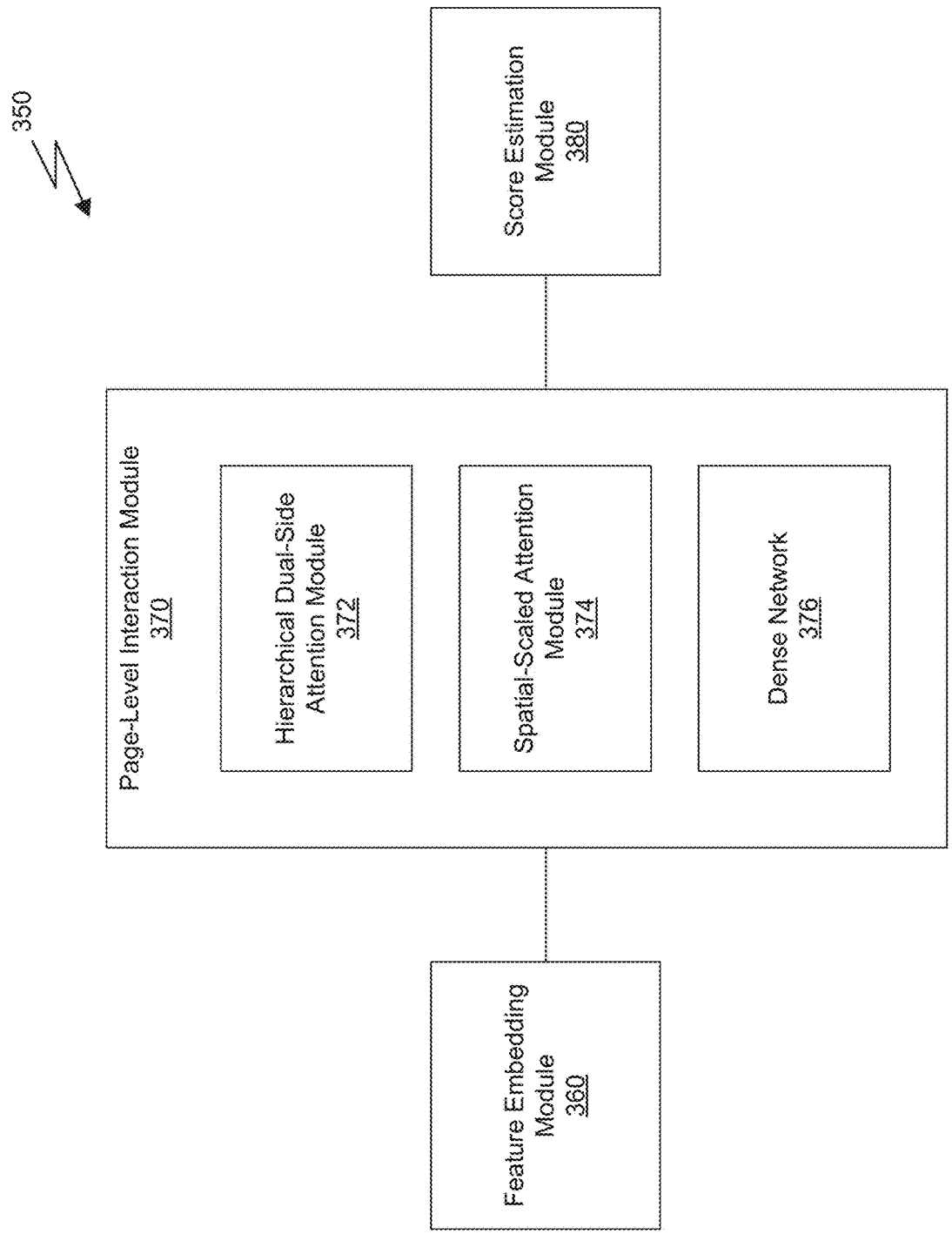
FIG. 3B is a diagram of an exemplary reranking model in accordance with one or more exemplary embodiments of the present disclosure.

FIG. 3B is a diagram of an exemplary reranking model 350. The reranking model 350 may include multiple layers of connected nodes (e.g., fully-connected networks) to form various functional modules. In this example, the reranking model 350 may include a feature embedding module 360, a page-level interaction module 370, and a score estimation module 380.

The feature embedding module 360 may be the first step in the reranking model 350 to process the input candidate lists. In an example, the feature embedding module 360 may receive input data in the form of a matrix and generate a dense feature vector for each element in a particular matrix for later interaction. The resulted matrices formed by dense feature vectors are referred to as embedding matrices. Input data may include user data (e.g., user history data) and candidate lists.

The page-level interaction module 370 may receive as input the embedding matrices output by the feature embedding module 360. As shown in FIG. 3B, the page-level interaction module 370 may include a hierarchical dual-side attention module 372 and a spatial-scaled attention module 374. The former may model interactions between user data and candidate lists, while the latter may model interactions between candidate lists and the page format. Additionally, the page-level interaction module 370 may include a dense network 376 to capture interactions between items in the candidate lists. The interactions may include inter-list and intra-list interactions. The page-level interaction module 370 may obtain a shared page representation from the hierarchical dual-side attention module 372, a pairwise item influence vector for each item in the candidate lists from the spatial-scaled attention module 374, and a dense feature for each item in the candidate lists from the dense network 376. The page-level interaction module 370 may aggregate the obtained results from the submodules to generate outputs to the score estimation module 380.

The score estimation module 380 may implement a multi-gate mixture-of-experts (MMoE) module to incorporate commonalities and differences in user behavior on different lists. The MMoE module may utilize a set of parallel expert networks to capture various aspects of behavior patterns. The set of expert networks may share across all candidate lists and each expert network may be trained to capture one aspect of behavior patterns. The MMoE module may further implement an attentional gate network to provide list-specific parameters for each individual candidate list. By applying the list-specific parameters from the attentional gate network, the MMoE may select a corresponding subset of expert networks to process the input corresponding to the particular candidate list. Through the expert and gate networks, the MMoE module may automatically adjust the parameterization between modeling shared information and list-specific information, thereby exploiting common behavior patterns while paying attention to list-specific patterns.

The score estimation module 380 may obtain reranking scores for items in the candidate lists based on the results from the MMoE module. The reranking model 350 may rely on the reranking scores to produce the final lists for display.

Referring back to FIG. 3A, at block 330, the processing system outputs recommendation results to be displayed on the recommendation page. The recommendation results may be formed from the items in the candidate lists according to the reranking scores of the items.

Figure 4:
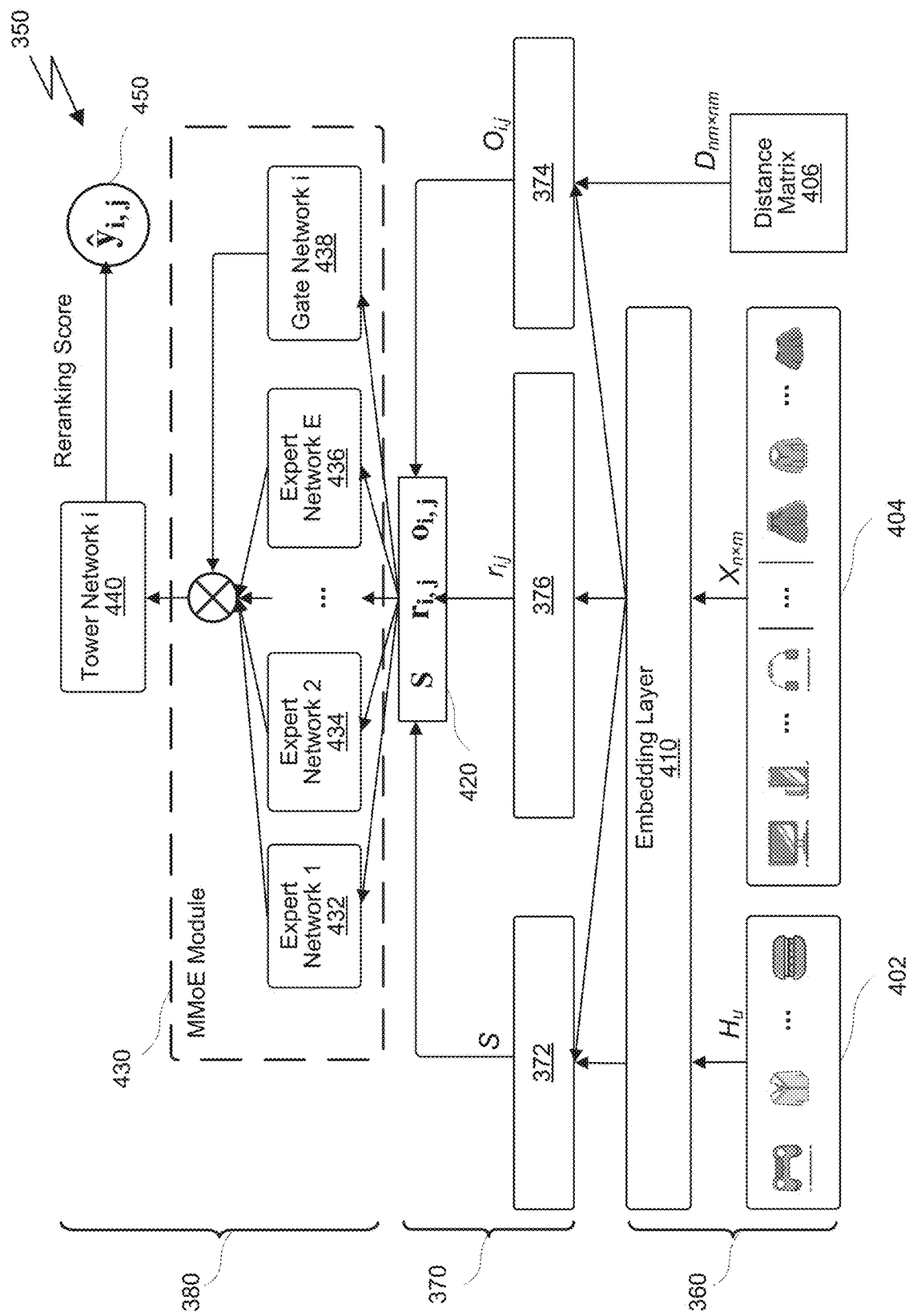
FIG. 4 illustrates an exemplary framework of the reranking model shown in FIG. 3B.

FIG. 4 illustrates an exemplary framework of the reranking model 350 as shown in FIG. 3B. The reranking model 350 can provide a unified model to capture the multifaceted fine-grained interactions for the entire page. As illustrated in FIG. 4, the reranking model 350 may be an end-to-end reranking model consisting of three layers, corresponding to the feature embedding module 360, the page-level interaction module 370, and the score estimation module 380 shown in FIG. 3B, respectively. The feature embedding module 360 may convert each item in an input list/matrix to a dense feature vector. The page-level interaction module 370 may include three submodules as shown in FIG. 3B to capture page-wise information. The score estimation module 380 may implement a MMoE module to learn the commonalities and differences among different lists and output predicted scores (e.g., reranking scores) for items.

As shown in FIG. 4, input to the reranking model 350 may include a history list ($H_u$) 402 for a user (u), a candidate item matrix ($X_{n \times m}$) 404, and a distance matrix ($D_{nm \times nm}$) 406. A candidate item refers to an item in a candidate list and a history item refers to an item in a history list. The history list ($H_u$) 402 may be formed based on user history data from a user (u). The history data may include behavioral information such as clicking, subscribing, and downloading in the past period of time, or other suitable user historical data. In an example, the history list ($H_u$) 402 may be formed by concatenating various categories of user data into a single list. The candidate item matrix ($X_{n \times m}$) 404 may be formed based on the candidate lists input to the reranking model 350. The candidate lists may be multiple lists output by a previous ranking stage in an MRS. In the candidate item matrix ($X_{n \times m}$) 404, n represents the number of candidate lists, m represents the maximum length of the candidate lists, and $x_{i,j}$ denotes the $j^{th}$ candidate item in the $i^{th}$ candidate list, where i=1, . . . , n and j=1, . . . , m. In an example, the number of candidate lists (n) may be determined based on the number of lists displayed on the recommendation page. In another example, the candidate lists may be of different sizes, such that the candidate lists may be resized according to the maximum length (m) before forming the candidate item matrix ($X_{n \times m}$) 404. A candidate list may be resized by removing one or more items from the list or populating the list with additional item(s). The maximum length (m) may be adjusted according to the required computing budget/efficiency in different usage scenarios. The distance matrix ($D_{nm \times nm}$) 406 may be formed according to the format of the recommendation page. In an example, the number of candidate lists (n) and the maximum length (m) may be determined/adjusted based on the format of the recommendation page.

The feature embedding module 360 may implement an embedding layer 410 to transform sparse raw features to low-dimensional dense embedding vectors. The embedding layer 410 may take as input both the history list ($H_u$) 402 and the candidate item matrix ($X_{n \times m}$) 404. Specifically, let $\hat{x}_{i,j} \in \mathbb{R}^{d_x}$ be the embedding of the candidate item $x_{i,j}$ from the candidate item matrix ($X_{n \times m}$) 404, and $\hat{h}_s \in \mathbb{R}^{d_h}$ be the embedding of the history item $h_s$ (where s=1, . . . , t) from the history list ($H_u$) 402, where $d_x$ and $d_h$ are the embedding size for the candidate item and the history item, respectively. To this end, the embedding layer 410 may output a candidate item embedding matrix $\hat{X} \in \mathbb{R}^{n \times m \times d_x}$ and a history item embedding matrix $\hat{H} \in \mathbb{R}^{t \times d_h}$, where t is the length of the history list ($H_u$) 402.

The distance matrix ($D_{nm \times nm}$) 406 may be determined based on distance information extracted from a recommendation page. When a recommendation page displays multiple lists, the arrangement of lists and items may affect the effectiveness of the recommendation and is therefore an important issue to consider. For instance, different page formats may change the position of items and thus the distance between items. Since the influence between items is usually negatively correlated with the distance between items, different page formats may have different influences between items. However, these issues have not been discussed in existing work on page-level reranking. To address these issues, the reranking model 350 of the present disclosure utilizes the distance matrix ($D_{nm \times nm}$) 406 formed based on distance information extracted from the recommendation page to incorporate the impact of item distance on the presentation of the recommendation results.

The distance matrix ($D_{nm \times nm}$) 406 may be formed based on distances measured by various suitable methods, such as Euclidean distance, slot counting, Manhattan distance, etc.

Figure 5:
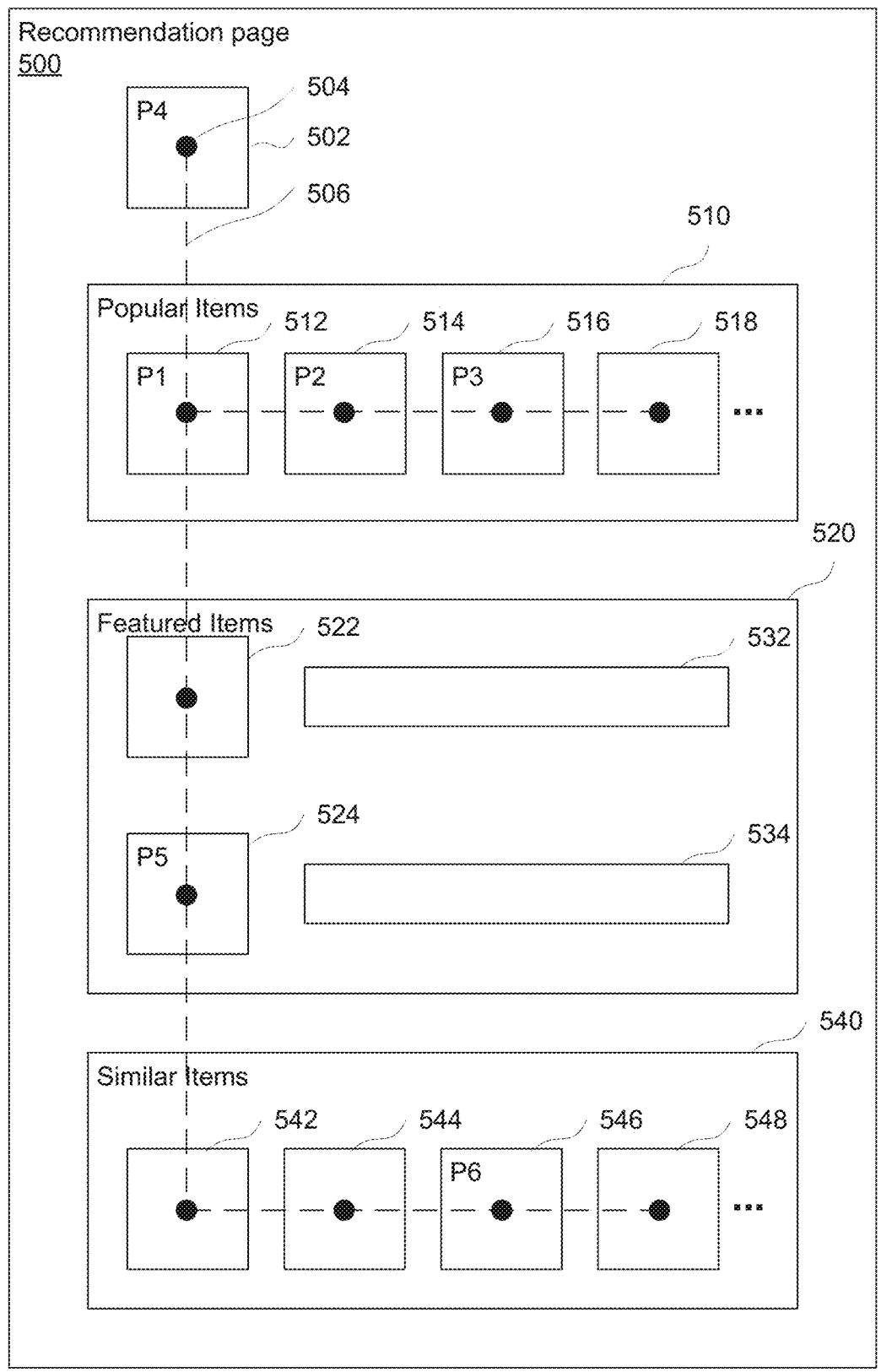
FIG. 5 illustrates an exemplary process for determining the Manhattan distance between items in an exemplary recommendation page in accordance with one or more exemplary embodiments of the present disclosure.

FIG. 5 illustrates an exemplary process for determining the Manhattan distance between items in an exemplary recommendation page 500. The Manhattan distance is defined as the distance between two points measured along axes at right angles. Each item on the recommendation page 500 may be associated with a point. For example, point 504 may be defined as the center of the single item in list 502.

The recommendation page 500 may present multiple lists 502, 510, 520, and 540. List 502 may include a single item, which may be an item selected by a user from a previous user interface. The position of the single item in List 502 may be denoted as P4. In this example, list 510 may include a number of items (e.g., 512, 514, 516, and 518) with the theme "Popular Items." The positions of items 512, 514, and 516 may be denoted as P1, P2, and P3, respectively. List 520 may include items 522 and 524 with the theme "Featured Items." Items 522 and 524 may correspond to descriptions 532 and 534, respectively. The position of item 524 may be denoted as P5. List 540 may include a number of items (e.g., 542, 544, 546, and 548) with the theme "Similar Items." The position of item 546 may be denoted as P6.

A dashed line represents a path traveled from a particular point to another point. For instance, dashed line 506 represents a path traveled from P1 to P4. Accordingly, the Manhattan distance between $P_1$ and $P_i$ (i=2, 3, 4, 5, 6) may be determined as one, two, one, two, five unit distances, respectively.

Furthermore, the distance between $P_1$ and $P_i$ (i=2, 3, 4, 5, 6) may represent the following five positional relationships on a multi-list page. $P_2$ is adjacent to $P_1$ in the same list. $P_3$ is distant from $P_1$ in the same list. $P_4$ is adjacent to $P_1$ in a neighboring list. $P_5$ is distant from $P_1$ in a neighboring list. $P_6$ is distant from $P_1$ in a remote list. Items' mutual influences related to the five positional relationships have been studied by Xi et al. in "A Bird's-eye View of Reranking: from List Level to Page Level," (available at arxiv.org/abs/2211.09303), which is hereby incorporated by reference in its entirety. The study shows that (1) item utility is influenced by other items in the same list; (2) item utility is influenced by other items in different lists; and (3) the influence between items is negatively correlated with the distance between items.

In another example, the reranking model 350 may determine the distance between items displayed on the recommendation page by calculating the number of pixels between corresponding points. The reranking model 350 may normalize the obtained distances to form the distance matrix ($D_{nm \times nm}$) 406. In a further example, the reranking model 350 may adjust the distance values in the distance matrix ($D_{nm \times nm}$) 406 based on other information from the recommendation page (e.g., slot size/shape for displaying a particular item).

Referring back to FIG. 4, the page-level interaction module 370 may receive embedding matrices ($\hat{H}$ and $\hat{X}$) from the embedding layer 410 and the distance matrix ($D_{nm \times nm}$) 406 to model interactions between these inputs. Particularly, the page-level interaction module 370 may include a hierarchical dual-side attention module 372, a spatial-scaled attention module 374, and a dense network 376. The hierarchical dual-side attention module 372 may process the embedding matrices $\hat{H}$ and $\hat{X}$ to obtain a shared page representation (S).

The dense network 376 may process the embedding matrix ($\hat{X}$) to obtain dense features ($r_{i,j}$) for items in the candidate lists. The spatial-scaled attention module 374 may process the embedding matrix $\hat{X}$ and the distance matrix ($D_{nm \times nm}$) 406 to obtain pairwise item interactions ($O_{i,j}$).

Figure 6:
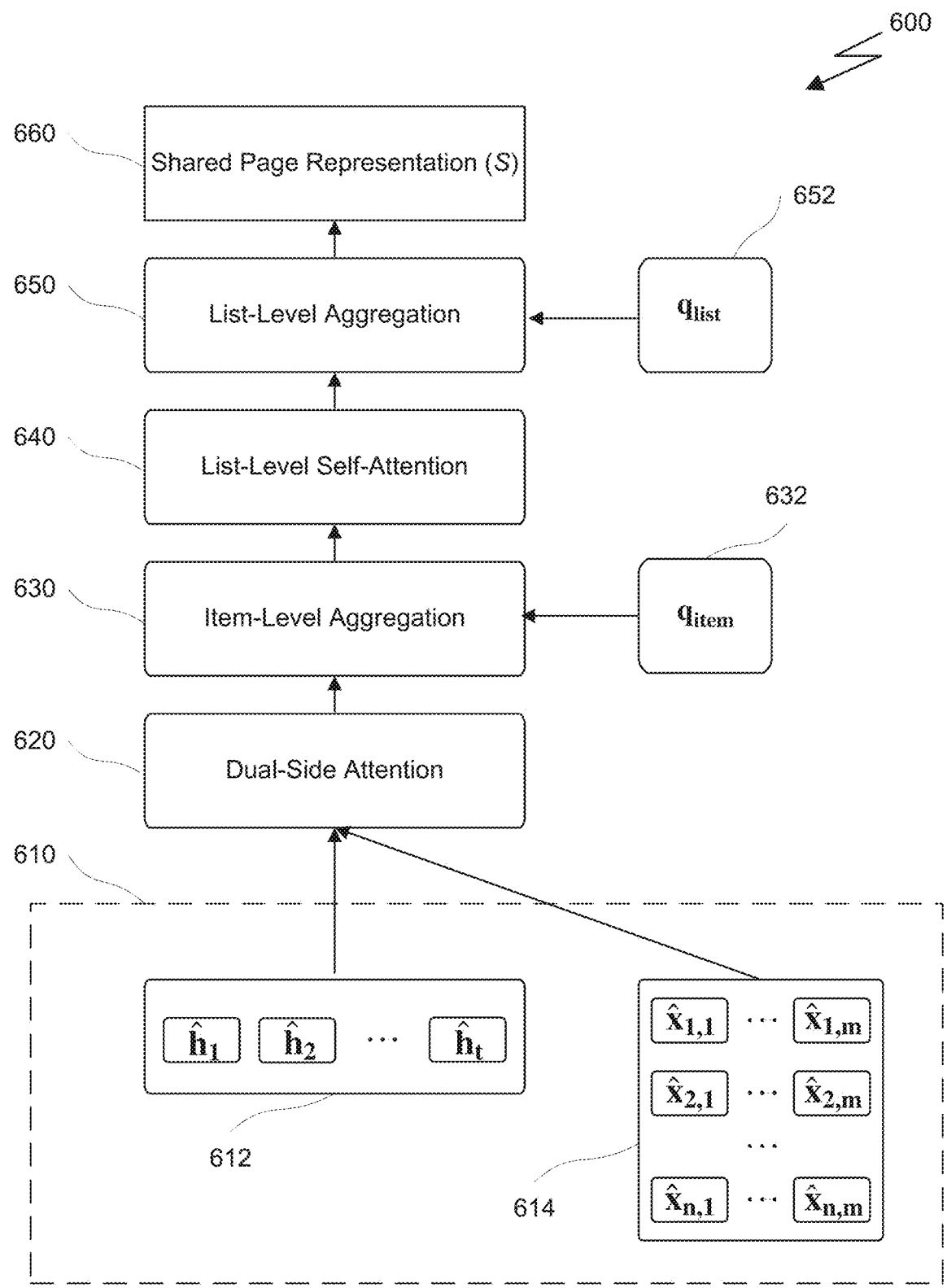
FIG. 6 is an exemplary scheme of the hierarchical dual-side attention module shown in FIG. 4.

FIG. 6 is an exemplary scheme 600 of the hierarchical dual-side attention module 372 as shown in FIG. 4. The hierarchical dual-side attention module is referred to as an HDS-Attn module hereinafter. One of the challenges of page-level reranking is incorporating both intra-list and inter-list interactions for the lists on a page. Given the natural hierarchy of items forming a list and lists forming a page, the reranking model 350 may consider intra-list and inter-list interactions in a hierarchical manner. As shown in the FIG. 6, the HDS-Attn module 372 in scheme 600 may include various layers (e.g., functional submodules) to perform different levels of interaction. From bottom to top, the HDS-Attn module 372 may include a dual-side attention layer 620, an item-level aggregation layer 630, a list-level self-attention layer 640, and a list-level aggregation layer 650. The input to the HDS-Attn module 372 is shown in block 610, which may include the embedding matrices ($\hat{H}$) 612 and ($\hat{X}$) 614 output by the feature embedding layer 360 as shown in FIG. 4. The output of the HDS-Attn module 372 may be a shared page representation (S) in block 660.

The dual-side attention layer 620 and the item-level aggregation layer 630 may be used to extract intra-list interactions for each candidate list. The dual-side attention layer 620 may be designed to model the mutual influences (e.g., fine-grained correlations) between two sides. One side refers to the candidate item side that may provide cross-item influences, while the other side refers to the history list side that may provide personal preference information. Then, the item-level aggregation layer 630 may be employed to combine the item information within the candidate list and generate a corresponding list representation.

A user's history list may contain rich information that can infer the user's personal preferences and tastes, providing insights for reranking. Furthermore, items in the user history list contribute differently to different candidate lists. For example, when reranking a "Top-10 Games" list for a user, gaming applications that appear in the user's history list may be more important than other types of applications.

Formally, for each candidate list ($R_i$) on the recommendation page (P), where i=1, ..., n, the input of the dual-side attention layer 620 is the corresponding $i^{th}$ item embedding matrix $\hat{X}_i \in \mathbb{R}^{m \times d_x}$ of the candidate list ($R_i$) and the history item embedding matrix $\hat{H} \in \mathbb{R}^{t \times d_h}$. The dual-side attention layer 620 may apply an affinity matrix $W_i^a \in \mathbb{R}^{d_h \times d_x}$ for each candidate list to learn the importance of the association between each pair of items from the item candidate side and the history list side, by applying:

$$C_i = \tanh(\hat{H} W_i^a \hat{X}_i^T), \quad \text{(Eq. 1a)}$$

$$A_i^x = \text{Softmax}(\tanh(\hat{X}_i W_i^x + (\hat{H} W_i^h)^T C_i)), \quad \text{(Eq. 1b)}$$

$$A_i^h = \text{Softmax}((\tanh(\hat{H} W_i^h + C_i(\hat{X}_i W_i^x)))^T), \quad \text{(Eq. 1c)}$$

$$\tilde{X}_i = A_i^x \hat{X}_i, \tilde{H}_i = A_i^h \hat{H} \quad \text{(Eq. 1d)}$$

where $W_i^x \in \mathbb{R}^{d_x \times m}$ and $W_i^h \in \mathbb{R}^{d_h \times m}$ are learnable weight matrices. The Softmax function converts a vector of k real numbers into a probability distribution of k possible outcomes. The matrices $A_i^x \in \mathbb{R}^{m \times m}$ and $A_i^h \in \mathbb{R}^{m \times t}$ represent the attention weights of items in the candidate list ($R_i$) and the history list, respectively. As a result, the dual-side attention layer 620 may obtain interacted representation matrices $\hat{X}_i=[\hat{x}_{i,j}]_{j=1}^m \mathbb{R}^{m \times d_x}$ and $\tilde{H}_i=[\tilde{h}_{i,j}]_{j=1}^m \mathbb{R}^{m \times d_h}$ which contain useful information from both the $i^{th}$ candidate list ($R_i$) and the user history list ($H_u$).

The item-level aggregation layer 630 may be applied to learn the intra-list interaction and generate list representations. Since items contribute differently to the representation of the target list Ri, the item-level aggregation layer 630 may aggregate the attained item representations with an attention mechanism to form the list representation $l_i$:

$$u_{i,j} = \tanh(W_l[\hat{x}_{i,j}\|\tilde{h}_{i,j}] + b_l), \quad \text{(Eq. 2a)}$$

$$\alpha_{i,j} = \frac{\exp(u_{i,j}^T q_{item})}{\sum_{j'=1}^m \exp(u_{i,j'}^T q_{item})}, \quad \text{(Eq. 2b)}$$

$$l_i = \sum_{i=1}^m \alpha_{i,j}[\hat{x}_{i,j}\|\tilde{h}_{i,j}], \quad \text{(Eq. 2c)}$$

where $\|$ denotes the vector concatenation. According to Equation 2a, the item-level aggregation layer 630 may first feed the concatenated item representations into a linear layer to get $u_{i,j}$ for each item $x_{i,j}$, where $W_l \in \mathbb{R}^{d_l \times d_l}$ and $b_l \in \mathbb{R}^{d_l}$ are learnable weights, $d_l = d_x + d_h$. According to Equation 2b, the importance of each item may be measured by the similarity of $u_{i,j}$ with an item-level query vector ($q_{item} \in \mathbb{R}^{d_l}$) 632. The item-level query vector ($q_{item}$) is a trainable parameter and may serve as an attention query in the item-level aggregation. According to Equation 2c, the item-level aggregation layer 630 may normalize the weights $a_{i,j}$ and compute the list representation $l_i$ by the weighted sum of each item in the target list ($R_i$). A list representation matrix L may be formed by stacking all the list representations:

$$L = [l_i]_{i=1}^n \in \mathbb{R}^{n \times d_l}. \quad \text{(Eq. 2d)}$$

The list-level self-attention layer 640 and the list-level aggregation layer 650 may be applied to capture the inter-list interaction between lists and generate the final page representation.

The list-level self-attention layer 640 may model the inter-list influence between different lists on the page according to:

$$\tilde{L} = \text{Softmax}\left(\frac{LL^T}{\sqrt{d_l}}\right)L, \quad \text{(Eq. 3)}$$

where matrix $\tilde{L}=[\tilde{l}_i]_{i=1}^n \in \mathbb{R}^{n \times d_l}$ is the re-weighted list representation matrix that captures the relationships and correlation between different lists, and $\sqrt{d_l}$ is used to stabilize gradients during training.

The list-level aggregation layer 650 may combine the information from different candidate lists and generate a unified (or shared) page representation (S) 660, according to:

$$v_i = \tanh(W_p \tilde{l}_i + b_p), \quad \text{(Eq. 4a)}$$

$$\beta_i = \frac{\exp(v_i^T q_{list})}{\sum_{i'=1}^n \exp(v_{i'}^T q_{list})}, \quad \text{(Eq. 4b)}$$

$$S = \sum_{i=1}^n \beta_i \tilde{l}_i, \quad \text{(Eq. 4c)}$$

where $W_p$ and $b_p$ are learnable weights. Similar to the item-level aggregation, after a linear transformation, the list-level aggregation layer 650 may apply a learnable list-level query vector ($q_{list} \in \mathbb{R}^{d_l}$) 652 for calculating the attention weights $\beta_i$. Then, the re-weighted list representations $\tilde{L}$ may be aggregated into a shared page representation (S) 660 by a weighted sum. In this way, the shared page representation (S) 660 may integrate the information of page-wise contexts and history behaviors, which may be shared by all the lists.

Figure 7:
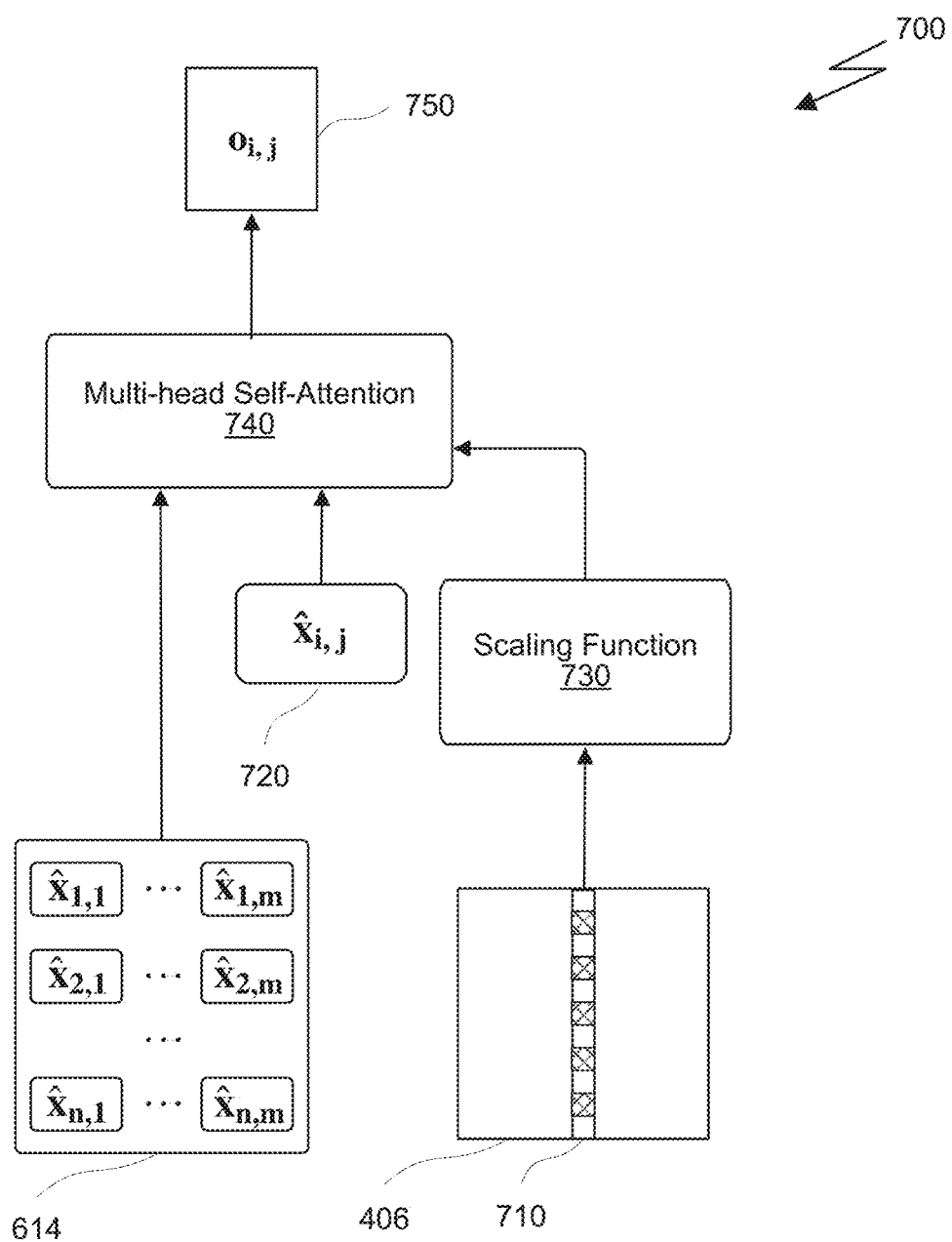
FIG. 7 is an exemplary scheme of the spatial-scaled attention module shown in FIG. 4.

FIG. 7 is an exemplary scheme 700 of the spatial-scaled attention module 374 as shown in FIG. 4. The spatial-scaled attention module is referred to as an SS-Attn module hereinafter. The SS-Attn module 374 may be designed to estimate pairwise item interactions while considering spatial relationships on the recommendation page. Particularly, the SS-Attn module 374 may adjust the attention weight according to the relative distance between items on the recommendation page, so that closer distances may result in stronger influence between items. In an example, the relative distance may vary according to the page format, allowing the SS-Attn module 374 to flexibly accommodate different page formats.

With a total of n×m number of items to be displayed on the recommendation page (P), the reranking model 350 may obtain a symmetric distance matrix (D∈ $\mathbb{R}^{nm \times nm}$) 406. Each element ($d_{p,q}$) in the distance matrix ($D_{nm \times nm}$) 406 may be a non-negative value indicating the geometric distance between corresponding pairs of items (p, q). In an example, the embedding matrix ($\hat{X} \in \mathbb{R}^{n \times m \times d_x}$) 614 may be reshape into a matrix ($\bar{X} \in \mathbb{R}^{nm \times d_x}$) before being input to the SS-Attn module 374. To this end, each row $\bar{x}_p$(p=1, . . . , nm) of the matrix ($\bar{X}$) may be the feature vector of a candidate item.

The SS-Attn module 374 may include multiple functional modules, such as a scaling function 720 and a multi-head self-attention module 740.

To involve the page format effect (i.e., the larger the distance, the less the influence between items), the scaling function 720 may transform the distance matrix $D_{nm \times nm}$) 406 by applying a learnable sigmoid function. The learnable sigmoid function $f$ is parameterized by the scalar v and maps the distance $d_{p,q}$ of the item pair (p, q) to a positive distance-aware influence factor $\hat{d}_{p,q}$ of range (0,1], $f(\cdot|v)$: $\mathbb{R}^* \to (0,1]$:

$$\hat{d}_{p,q} = f(d_{p,q} | v) = \frac{1 + \exp(v)}{1 + \exp(v + \sigma d_{p,q})}, \quad \text{(Eq. 5)}$$

where $v \in \mathbb{R}$ is a learnable scalar that determines the steepness of the sigmoid function $f(\cdot|v)$, and $\sigma > 0$ is a hyperparameter for normalizing the distance $d_{p,q}$ and stabilizing the training. $\sigma$ is tunable.

As shown in FIG. 7, the scaling function 730 may first retrieve a single column from the distance matrix ($D_{nm \times nm}$) 406 to calculate the influence factor ($\hat{d}_{p,q}$) for the elements in the particular column. The retrieved column 710 may be referred to as a target column, which contains the distance between a corresponding target item 720 and each of the mxn number of items in the candidate lists. As such, the scaling function 730 may obtain a set of pair-wise influence factors for the target item 720 based on the target column 710. The scaling function 730 may repeat these calculations for the remaining columns in the distance matrix ($D_{nm \times nm}$) 406 to obtain influence factors corresponding to the remaining items in the candidate lists.

Then, the SS-Attn module 374 may use the influence factors from the scaling function module 720 to scale the influence (e.g., interactions) between items. In this example, the SS-Attn module 374 may use the multi-head self-attention module 740 to model the interaction between any pair of items on the page, while scaling the attention weights according to the distance-aware influence factors. The multi-head self-attention module 740 may be a Transformer network. The multi-head self-attention module 740 may include B number of attention heads. Accordingly, B number of different learnable sigmoid functions may be maintained to learn different levels of the page format effect, where the scalar $v^{(b)}$ corresponds to the $b^{th}$ attention head and $b=1, \ldots, B$.

The SS-Attn module 374 may form all the influence factors ($\hat{d}_{p,q}$) for the $b^{th}$ attention head into a matrix $\hat{D}^{(b)}$ and numerically scale the preliminary self-attention weights by:

$$\overline{O}^{(b)} = \text{Softmax}\left(\frac{\phi\left((\overline{X}W_Q^{(b)})(\overline{X}W_K^{(b)})^T \odot \hat{D}^{(b)}\right)}{\sqrt{d_a}}\right)(\overline{X}W_V^{(b)}), \quad \text{(Eq. 6)}$$

where $\odot$ is the element-wise product, $W_Q^{(b)}$, $W_K^{(b)}$, and $W_V^{(b)}$ are learnable weights corresponding to the $b^{th}$ attention head in the multi-head self-attention module 740, and $d_a$ is the dimension of the vectors $\overline{X}W_Q^{(b)}$ and $\overline{X}W_K^{(b)}$. The preliminary attention weights $(\overline{X}W_Q^{(b)})(\overline{X}W_K^{(b)})^T$ may be adjusted according to the distance-aware influence factors. $\phi$ is a non-negative monotonically increasing function introduced to avoid negative attention weights, since negative preliminary attention weights can invert the distance-aware influence, thus leading to violation of the negative correlation between distance and influence. Alternatively and/or additionally, other suitable functions may be implement to constrain the output to always be positive, such as a Softplus function.

The multi-head self-attention module 740 may concatenate the outputs from the B number of attention heads, and apply a linear transformation to get the pairwise influence matrix ($\overline{O} \in \mathbb{R}^{nm \times d_o}$):

$$\overline{O} = [\overline{O}^{(1)}|\ldots|\overline{O}^{(B)}]W_O, \quad \text{(Eq. 7)}$$

where $d_o$ is the size of the attention output. The multi-head self-attention module 740 may further reshape the pairwise influence matrix ($\overline{O} \in \mathbb{R}^{nm \times d_o}$) into a matrix $O \in \mathbb{R}^{nm \times d_o}$ where the vector ($o_{i,j} \in \mathbb{R}^{d_o}$) 750 denotes the pairwise influence vector for the $j^{th}$ item in the $i^{th}$ list.

Referring back to FIG. 4, the dense network 376 may implement a fully-connected network, such as a multi-layer perceptron (MLP) network, to process the embedding matrix $\hat{X}$ to obtain dense features for items in the candidate lists. For example, the dense network 376 may determine a dense feature ($r_{i,j}$) for a particular item according to:

$$r_{i,j} = MLP(\hat{x}_{i,j}) \quad \text{(Eq. 8)}$$

where $\hat{x}_{i,j}$ represents an element in the embedding matrix, and MLP indicates that a MLP network is applied for the determination.

At block 420, the reranking model 350 may concatenate the results from the HDS-Attn module 372, the SS-Attn module 374, and the dense network 376 to form the output of the page-level interaction module 370. In this example, the results may include the shared page representation (S), the dense feature ($r_{i,j}$) for item ($x_{i,j}$), and the pairwise item interactions ($o_{i,j}$).

The score estimation module 380 may take the output of the page-level interaction module 370 to determine reranking scores for the items in the candidate lists. The score estimation module 380 may implement a MMoE module 430 to incorporate commonalities and differences in user behavior to the reranking process.

The MMoE module 430 may include E number of expert networks (e.g., 432, 434, and 436) in parallel, which may be represented by $\{e_k(\cdot)\}_{k=1}^E$. The expert networks may be MLPs with ReLU activations, which may be designed to capture different aspects of behavior patterns. Furthermore, the MMoE module 430 may include a separate fully-connected gate network ($g_i(\cdot)$) 438 to learn a linear combination of the expert outputs $\gamma_{i,j} \in \mathbb{R}^E$, with $\gamma_{i,j,k}$ being the $k^{th}$ element of $\gamma_{i,j}$. The score estimation module 380 may perform the following calculations through the MMoE module 430 and the tower network module 440:

$$\gamma_{i,j} = \text{Softmax}(g_i([D||r_{i,j}||o_{i,j}])), \quad \text{(Eq. 9a)}$$

$$\hat{z}_{i,j} = \sum_{k=1}^E \gamma_{i,j,k} \times e_k([S||r_{i,j}||o_{i,j}]), \quad \text{(Eq. 9b)}$$

$$\hat{y}_{i,j} = t_i(\hat{z}_{i,j}). \quad \text{(Eq. 9c)}$$

According to Equation 9c, the score estimation module 380 may feed the combined feature vector $\hat{z}_{i,j}$ into a list-specific tower network ($t_i(\cdot)$) 440 to obtain the final score ($\hat{y}_{i,j}$) 450 for the $j^{th}$ item in the $i^{th}$ list, in order to preserve the list-specific information.

The reranking model 350 may sort items in each list based on the scores ($\hat{y}_{i,j}$) to obtaining the reranked lists.

Given a click label matrix Y of size $n \times m$ where $y_{i,j}$ denotes the click signal for the the $j^{th}$ item in the $i^{th}$ list, the reranking model 350 may be optimized via binary cross-entropy loss ($\mathcal{L}$) on a training page set $\mathcal{P}$:

$$\mathcal{L} = \sum_{\mathcal{P}} \sum_{i=1}^n \sum_{j=1}^m y_{i,j}\log\hat{y}_{i,j} + (1-y_{i,j})\log(1-\hat{y}_{i,j}). \quad \text{(Eq. 10)}$$

Figure 8:
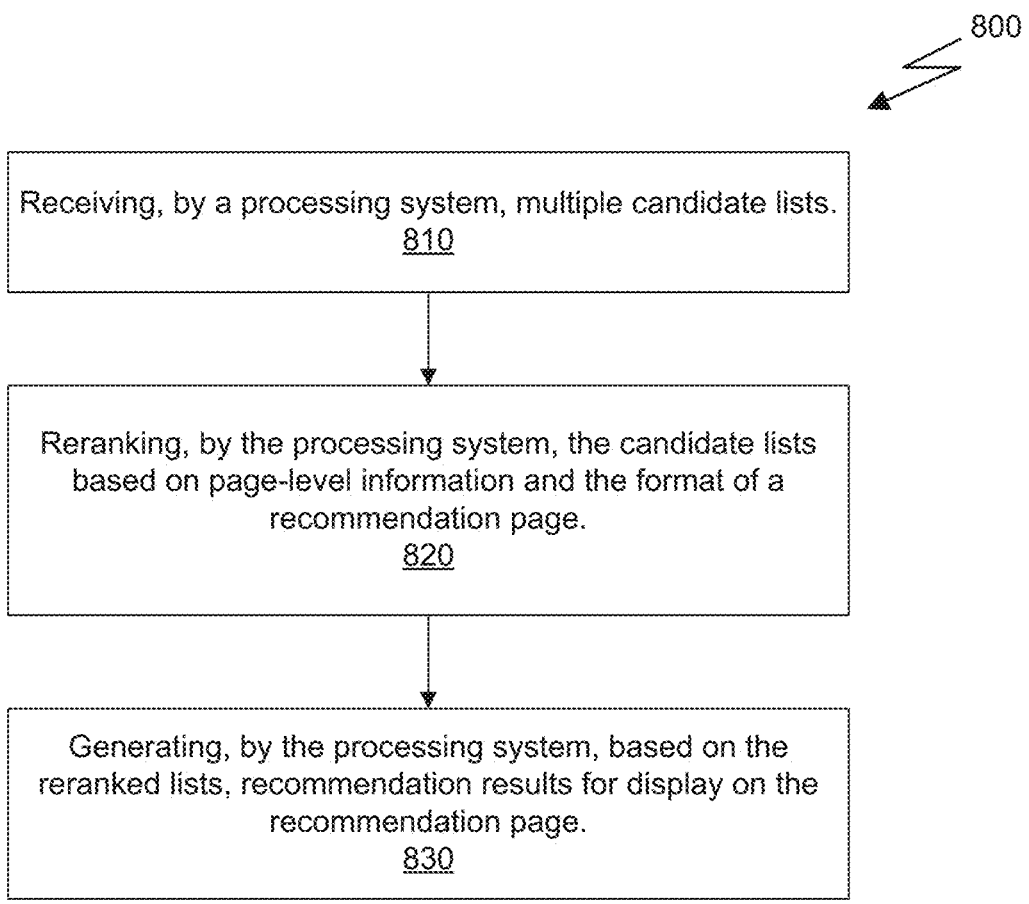
FIG. 8 is an exemplary reranking process performed by the reranking model shown in FIG. 3B.

FIG. 8 is an exemplary reranking process 800 performed by the reranking model 350 as shown in FIG. 3B. The reranking model 350 may be implemented in a processing system. The processing system may include one or more computer systems 150 as illustrated in FIG. 1B, which may be embodied as one or more client devices 120, one or more servers 130, or a combination thereof in network environment 100 as depicted in FIG. 1A. Processer(s) 160 in the processing system may execute instructions stored in memory 180 to perform the reranking process 800. The reranking process 800 may be performed alone or in combination with other processes in the present disclosure. It will be appreciated by one skilled in the art that the reranking process 800 may be performed in any suitable environment and blocks in process 800 may be performed in any suitable order. The reranking model 350 may be implemented in any suitable stage of a recommender system, such as an intermediate stage or the final stage of a recommender system.

At block 810, the processing system receives multiple candidate lists. The generation of the candidate lists may refer to block 310 of the recommendation process 300 as shown in FIG. 3A.

At block 820, the processing system re-ranks the candidate lists based on page-level information and the format of a recommendation page. The processing system may adopt the framework as shown in FIG. 4 to process the candidate lists. Referring to FIG. 4, the processing system may apply the HDS-Attn module 372 to generate a shared page representation (S) as the page-level information for the candidate lists. The page-level information may include inter-list and intra-list interactions, which may be combined with user history data. The processing system may apply the SS-Attn module 374 to determine influences between items caused by the format of the recommendation page. Then, the processing system may apply the MMoE module 430 to incorporate commonalities and differences in user behavior on different candidate lists. In this way, the processing system may generate reranking scores for the items in the candidate lists.

At block 830, the processing system generates recommendation results based on the reranked lists for display on the recommendation page. The items in the reranked lists may be sorted according to the reranking scores.

In an example, the processing system may cause the items in the reranked lists to be displayed in corresponding positions according to the format of the recommendation page. Alternatively, the processing system may output the reranked lists to the next stage for further processing.

Figure 9A:
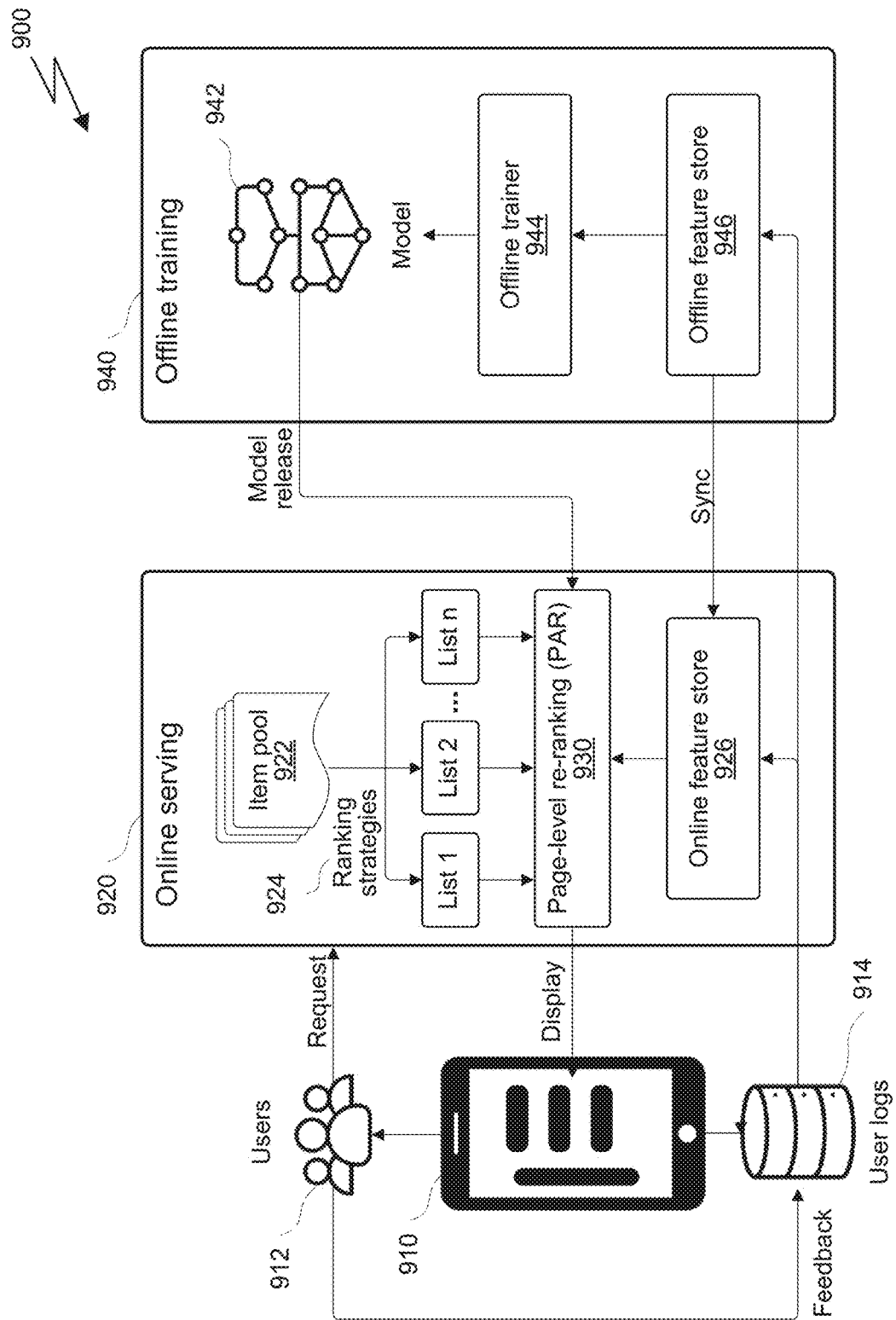
FIG. 9A is an exemplary system implementation of a page-level re-ranking (PAR) model.

FIG. 9A is an exemplary system implementation 900 of a page-level re-ranking (PAR) model 930. The PAR model 930 may be an embodiment of the re-ranking model 350 as shown in FIG. 3B. The system implementation 900 may be facilitated by a processing system. The processing system may include one or more computer systems 150 as illustrated in FIG. 1B, which may be embodied as one or more client devices 120, one or more servers 130, or a combination thereof in network environment 100 as depicted in FIG. 1A. Processer(s) 160 in the processing system may execute instructions stored in memory 180 to perform any of the processes, either alone or in combination with other processes in the present disclosure.

As shown in FIG. 9A, the system implementation 900 may include an online serving module 920 and an offline training module 940. The system implementation 900 may further include or couple to a terminal device (e.g., a smartphone) 910, which may interact with the online serving module 920 and/or the offline training module 940. The system implementation 900 may be applied in various usage scenarios, such as video, music, news, or e-commence recommendations.

The terminal device 910 may display a recommendation page (e.g., the recommendation page 240 as shown in FIG. 2B), provide customized recommendations to the users 912 via the recommendation page, and collect user-specific data (e.g., user clicks, history data, etc.) to be stored in user logs 914. The user logs 914 may be a designated storage space, which may include local storage, online storage, or a combination thereof. Furthermore, the user logs 914 may receive feedback from the users 912, either through the terminal device 910 or through a computer system 150 communicatively connected to the user logs 914. The feedback may include user preferences, comments, related social media posts, and other suitable information. In an example, the users 912 may observe the recommendation pages and click the items they feel interested. Then, the system implementation 900 may log the user feedback to the user logs 914.

The online serving module 920 may perform a recommendation process similar to the recommendation process 300 described with reference to FIG. 3A. In more detail, the online service module 920 may receive requests from the users 912. Upon receiving a specific request, the online serving module 920 may recall items from an item pool 922. Then, the online serving module 920 may apply one or more ranking strategies (e.g., through one or more ranking models) to generate n number of candidate lists (such as List 1, List 2, . . . , List n shown in block 920) based on the recalled items from the item pool 922. Each candidate list may include m number of candidate items. In an example, the online serving module 920 may determine the numbers n and m based on the page information associated with the recommendation page. In a further example, the page information associated with the recommendation page may be stored in the user logs 914.

The PAR model 930 in the online serving module 920 may receive the multiple candidate lists from the upstream ranking strategies 924 and retrieve the corresponding user and/or item features from an online feature store 926 to generate reranked lists for the entire recommendation page, which may be displayed on the terminal device 910 to the specific user. The PAR model 930 may implement the framework as shown in FIG. 4 to process the candidate lists and the retrieved user and/or item features. The user and/or item features may be used to form a user history list (e.g., the history list 402) and/or a distance matrix (e.g., the distance matrix 406). The online feature store 926 may provide the user and/or item features based on data obtained from the user logs 914. The PAR model 930 may be continuously updated based on the model trained by the offline training module 940. For example, some or all of the learnable weights in the PAR model 930 may be updated based on the released model from the offline training module 940.

The offline training module 940 may include a model 942, an offline trainer 944 and an offline feature store 946. The model 942 may be formed by parameterizing a portion or all of the PAR model 930. The offline trainer 944 may periodically train and update parameters (e.g., learnable weights in one or more submodules) in the PAR model 930 with new data. For instance, the offline trainer 944 may train the model 942 by applying binary cross-entropy loss (L) according to Equation 10. The offline feature store 946 may obtain data from the user logs 914 to generate a training dataset for the offline trainer 944 to train the model 944. To this end, the offline training module 940 may provide the updated parameters to the PAR model 930 by releasing the trained model 942. In an example, offline feature store 946 may obtain data or training datasets from data sources other than the user logs 914. In another example, the online feature store 926 and the offline feature store 946 may obtain data from the user logs 914 at different times (e.g., at different periods). The offline training module 946 may synchronize some or all of the data stored therein with the online training module 926 periodically or according to requests by the system 900.

Figure 9B:
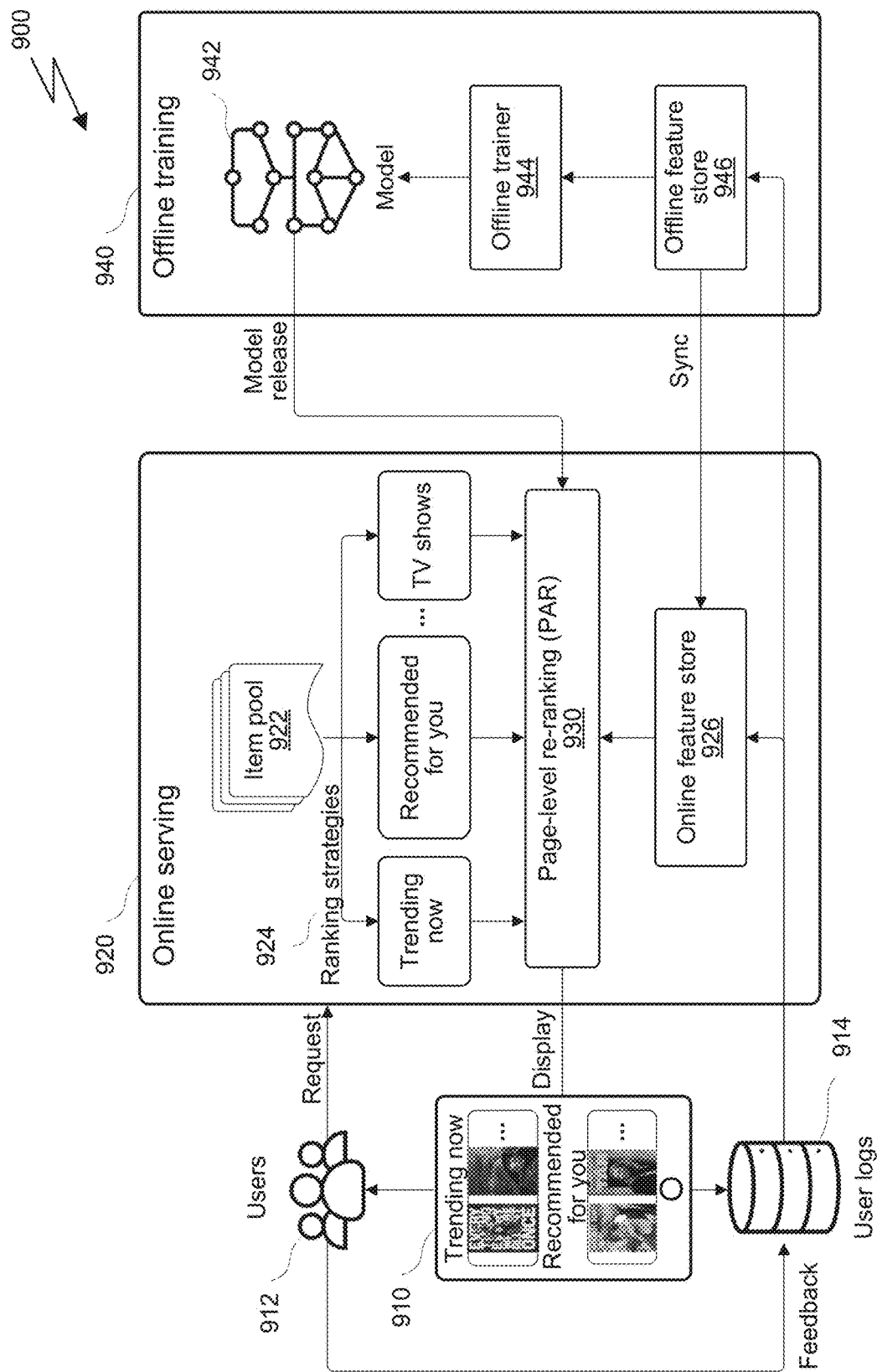
FIG. 9B is an exemplary application of the system implementation shown in FIG. 9A for providing video recommendations.

FIG. 9B is an exemplary application of the system implementation 900 as shown in FIG. 9A for providing video recommendations. The recommendation page displayed on the terminal device 910 may include multiple lists, including themes "Trending now," "Recommended for you," and so on. Correspondingly, the online serving module 920 may generate candidate lists associated with themes in the recommendation page, such as "Trending now," "Recommended for you," "TV shows," etc. The system implementation 900 may use the PAR model 930 to generate reranked lists and provide video recommendations to be displayed on the terminal device 910 to the users 912. The PAR model 930 may provide predicted scores (e.g., reranking scores) for the items in the reranked lists. The items in the reranked lists may be sorted according to the predicted scores and then placed into the corresponding positions according to the format (e.g., layout) of the recommendation page. As a result, items with higher scores may be placed in the top positions (e.g., the most prominent positions) of the recommendation page.

Additional details and advantages relating to exemplary embodiments of the present disclosure are discussed by Xi et al. in "A Bird's-eye View of Reranking: from List Level to Page Level," (available at arxiv.org/abs/2211.09303), which is hereby incorporated by reference in its entirety.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods/processes described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system for reranking, comprising:
    a user device, comprising a display and a communications interface; and
    one or more servers in communication with the user device via a communication network and the communications interface of the user device;
    wherein the one or more servers are configured to:
        receive a plurality of candidate lists, each candidate list comprising a plurality of candidate items;
        rerank candidate items of the plurality of candidate lists based on page-level information and a format of a recommendation page, wherein the page-level information comprises interactions between the candidate items in each candidate list and between different candidate lists among the plurality of candidate lists, and wherein the reranking comprises using the format of the recommendation page to determine pairwise item influences between candidate item pairs among the candidate items in the plurality of candidate lists;
        generate recommendation results based on the reranked lists; and
        send the recommendation results to the user device; and
    wherein the user device is configured to display the recommendation page with the recommendation results from the one or more servers.

2. The system according to claim 1, wherein the one or more servers are further configured to:
    obtain item-level interactions for each candidate list among the plurality of candidate lists, wherein the item-level interactions comprise interactions between each pair of candidate items in the candidate list among the plurality of candidate lists, and wherein the item-level interactions comprise interactions between the candidate items in the plurality of candidate lists and user history data;
    obtain, based on the item-level interactions for the plurality of candidate lists, list-level interactions for the recommendation page, wherein the list-level interactions comprise interactions between each pair of candidate lists among the plurality of candidate lists; and generate, based on the list-level interactions, a shared page representation for the recommendation page as the page-level information.

3. The system according to claim 2, wherein the user history data comprises user clicking, subscribing, downloading, and any combination thereof in a past period of time.

4. The system according to claim 1, wherein the one or more servers are further configured to:
generate a distance matrix based on the format of the recommendation page, wherein each element in the distance matrix indicates a distance between a corresponding pair of candidate items from the plurality of candidate lists; and
determine, based on the distance matrix, the pairwise item influences between the corresponding candidate item pairs among the candidate items in the plurality of candidate lists.

5. The system according to claim 4, wherein the distance between the corresponding pair of candidate items from the plurality of candidate lists is determined based on Euclidean distance, slot counting, or Manhattan distance.

6. The system according to claim 4, wherein the distance between the corresponding pair of candidate items from the plurality of candidate lists is categorized into one of five positional relationships according to positions of the pair of candidate items to be displayed on the recommendation page, and wherein the five positional relationships include:
(a) a pair of adjacent items in a same list;
(b) a pair of distant items in a same list;
(c) a pair of adjacent items in neighboring lists;
(d) a pair of distant items in neighboring lists; and
(e) a pair of distant items in different lists, wherein the different lists are not neighboring lists.

7. The system according to claim 4, wherein the one or more servers are further configured to: determine a pairwise item influence vector for each candidate item in the plurality of candidate lists; and
wherein the reranking based on the page-level information and the format of the recommendation page further comprises: determining reranking scores for each candidate item in the plurality of candidate lists based on the page-level information and the pairwise item influence vector for the candidate item in a particular candidate list among the plurality of candidate lists.

8. The system according to claim 1, wherein the reranking based on the page-level information and the format of the recommendation page further comprises:
generating a combined feature vector for each candidate item in the plurality of candidate lists, based on the page-level information, the pairwise item influences associated with the candidate item, and a dense feature for the candidate item;
determining for the particular candidate list comprising the candidate item, a set of parameters to select a subset of trained networks among a plurality of trained networks to process the combined feature vector for the candidate item; and
determining a reranking score for the candidate item, based on outputs from the subset of trained networks.

9. The system according to claim 8, wherein the generation of the recommendation results based on the reranked lists for display on the recommendation page further comprises: sorting candidate items in the reranked lists, according to the reranking scores for the corresponding candidate items; and wherein the user device is further configured to: display the sorted candidate items in the reranked lists into corresponding positions according to the format of the recommendation page.

10. The system according to claim 8, wherein each candidate list among the plurality of candidate lists is associated with a particular set of parameters to select a particular subset of trained networks among the plurality of trained networks.

11. The system according to claim 8, wherein each trained network among the plurality of trained networks is trained to capture one aspect of behavior patterns.

12. The system according to claim 1, wherein the reranking based on the page-level information and the format of the recommendation page is performed using a single model, and wherein the single model is trained and updated periodically through offline training.

13. The system according to claim 1, wherein the recommendation page is in a multi-list style.

14. The system according to claim 1, wherein the recommendation results comprises video, music, news, or e-commence recommendations.

15. A computer-implemented method for reranking, comprising:
receiving, by a processing system, a plurality of candidate lists, each candidate list comprising a plurality of candidate items;
reranking, by the processing system, candidate items of the plurality of candidate lists based on page-level information and a format of a recommendation page, wherein the page-level information comprises interactions between the candidate items in each candidate list and between different candidate lists among the plurality of candidate lists, and wherein the reranking comprises using the format of the recommendation page to determine pairwise item influences between candidate item pairs among the candidate items in the plurality of candidate lists; and
generating, by the processing system, recommendation results based on the reranked lists for display on the recommendation page.

16. The computer-implemented method according to claim 15, further comprises:
obtaining, by the processing system, item-level interactions for each candidate list among the plurality of candidate lists, wherein the item-level interactions comprise interactions between each pair of candidate items in the candidate list among the plurality of candidate lists, and wherein the item-level interactions comprise interactions between the candidate items in the plurality of candidate lists and user history data;
obtaining, by the processing system, based on the item-level interactions for the plurality of candidate lists, list-level interactions for the recommendation page, wherein the list-level interactions comprise interactions between each pair of candidate lists among the plurality of candidate lists; and
generating, by the processing system, based on the list-level interactions, a shared page representation for the recommendation page as the page-level information.

17. The computer-implemented method according to claim 15, further comprising:
generating, by the processing system, a distance matrix based on the format of the recommendation page, wherein each element in the distance matrix indicates a distance between a corresponding pair of candidate items from the plurality of candidate lists; and determining, by the processing system, based on the distance matrix, the pairwise item influences between the corresponding candidate item pairs among the candidate items in the plurality of candidate lists.

18. The computer-implemented method according to claim 17, further comprising:
    determining, by the processing system, a pairwise item influence vector for each candidate item in the plurality of candidate lists,
    wherein the reranking based on the page-level information and the format of the recommendation page further comprises:
    determining, by the processing system, reranking scores for each candidate item in the plurality of candidate lists based on the page-level information and the pairwise item influence vector for the candidate item in a particular candidate list among the plurality of candidate lists.

19. The computer-implemented method according to claim 15, wherein the reranking based on the page-level information and the format of the recommendation page further comprises:
    generating, by the processing system, a combined feature vector for each candidate item in the plurality of candidate lists, based on the page-level information, the pairwise item influences associated with the candidate item, and a dense feature for the candidate item;
    determining, by the processing system, for the candidate list comprising the candidate item, a set of parameters to select a subset of trained networks among a plurality of trained networks to process the combined feature vector for the candidate item; and
    determining, by the processing system, a reranking score for the candidate item, based on outputs from the subset of trained networks.

20. A non-transitory computer-readable medium having computer-executable instructions stored thereon for reranking, the computer-executable instructions, when executed by one or more processors, causing the one or more processors to facilitate:
    receiving a plurality of candidate lists, each candidate list comprising a plurality of candidate items;
    reranking candidate items of the plurality of candidate lists based on page-level information and a format of a recommendation page, wherein the page-level information comprises interactions between the candidate items in each candidate list and between different candidate lists among the plurality of candidate lists, and wherein the reranking comprises using the format of the recommendation page to determine pairwise item influences between candidate item pairs among the candidate items in the plurality of candidate lists; and
    generating recommendation results based on the reranked lists for display on the recommendation page.

* * * * *

UNITED STATES PATENT AND TRADEMARK OFFICE
CERTIFICATE OF CORRECTION

Page 1 of 1

PATENT NO. : 12,182,141 B2
APPLICATION NO. : 18/191704
DATED : December 31, 2024
INVENTOR(S) : Liu et al.

It is certified that error appears in the above-identified patent and that said Letters Patent is hereby corrected as shown below:

In the Claims

Claim 8: Column 23, Line 55: "determining for the particular candidate list comprising" should read as -- determining for the candidate list comprising --.

Signed and Sealed this
Seventeenth Day of June, 2025

Coke Morgan Stewart
*Acting Director of the United States Patent and Trademark Office*